United States Patent [19]

Baer et al.

[11] Patent Number: 4,980,882

[45] Date of Patent: Dec. 25, 1990

[54] OPTICAL DISK FOR DETESTING AND DISTINGUISHING SERVO TRACKS FROM DATA TRACKS

[75] Inventors: James W. Baer, Boulder; Majed K. Abed, Lafayette, both of Colo.

[73] Assignee: Storage Technology Corporation Partners II, Louisville, Colo.

[21] Appl. No.: 277,537

[22] Filed: Nov. 28, 1988

Related U.S. Application Data

[63] Continuation of Ser. No. 36,136, Apr. 6, 1987, abandoned, which is a continuation of Ser. No. 615,421, May 29, 1984, abandoned.

[51] Int. Cl.$^5$ .............................................. G11B 7/007
[52] U.S. Cl. ............................ 369/275.3; 369/44.23; 369/44.26; 369/44.38; 369/111
[58] Field of Search ............................ 369/32, 44-48, 369/54, 58, 59, 106, 109, 111, 275, 275.3; 365/234

[56] References Cited

U.S. PATENT DOCUMENTS

| | | | |
|---|---|---|---|
| 3,654,401 | 4/1972 | Dickopp et al. | 369/112 X |
| 3,737,877 | 6/1973 | Feinleib | 369/32 X |
| 3,962,688 | 6/1976 | Westerberg | 369/32 X |
| 4,037,252 | 7/1977 | Janssen | 369/111 X |
| 4,094,010 | 6/1978 | Pepperl et al. | 369/44 X |
| 4,106,058 | 8/1978 | Romeas et al. | 369/32 |
| 4,160,270 | 7/1979 | Goldschmidt et al. | 369/110 X |
| 4,229,808 | 10/1980 | Hui | 365/234 |
| 4,260,858 | 4/1981 | Beiser | 369/103 |
| 4,275,275 | 6/1981 | Bricot et al. | 369/111 X |
| 4,282,598 | 8/1981 | Elliott | 369/119 X |
| 4,283,777 | 8/1981 | Curry et al. | 369/109 X |
| 4,290,122 | 9/1981 | Bates et al. | 369/59 X |
| 4,363,116 | 12/1982 | Kleuters et al. | 369/275 X |
| 4,498,158 | 2/1985 | Akiyama | 369/32 |
| 4,532,621 | 7/1985 | Nakagawa | 369/111 |
| 4,562,562 | 12/1985 | Moriya et al. | 369/32 |

OTHER PUBLICATIONS

Encyclopedia of Computer Science and Engineering, Second Edition, Anthony Ralson, Editor; Edwin D. Reilly, Jr., Associate Editor, 1983, pp. 1104–1105.
IEEE Standard Dictionary of Electrical and Electronics Terms—Second Edition—An American National Standard; Frank Jay, Editor-in-Chief; 1978, pp. 472–473.
E. G. Lean, GaAs Laser Array and Fiber-Optic Detector Array for Disc Application; 12/80; vol. 23, #7A, IBM Tech. Disc. Bulletin, pp. 2992–2993.

Primary Examiner—Vincent P. Canney
Assistant Examiner—W. R. Young
Attorney, Agent, or Firm—Dorr, Carson, Sloan and Peterson

[57] ABSTRACT

An improved coarse access and tracking servo system for use with an optical disk storage system is disclosed. Concentric servo tracks placed on the disk are readily distinguished from data tracks placed on the disk which may or may not be present on the disk depending upon the amount of information that has been written on the disk, i.e., how "full" the disk is with respect to its maximum capacity for storing data. A predetermined signal is embedded within each of the plurality of concentric servo tracks found on the disk. A radial strip or line, sufficiently long to always include at least one servo track, but also long enough to include data tracks, if any, on either side of the illuminated servo track is projected on the surface of the disk in order to detect the servo tracks. Light returned from the illuminated servo tracks falls upon a detector and generates a frequency component that is readily distinguished from any frequency components associated with signals generated from light returned from any of the data tracks. The position of the servo track within the illuminated radial strip or line is then accurately determined, regardless of whether data tracks are present or not within the illuminated strip or line. This position of the servo track within the illuminated radial strip or line is then used by the coarse access and tracking servo system in order to accurately position an optical head at a desired position with respect to a selected coarse servo track on the disk.

6 Claims, 12 Drawing Sheets

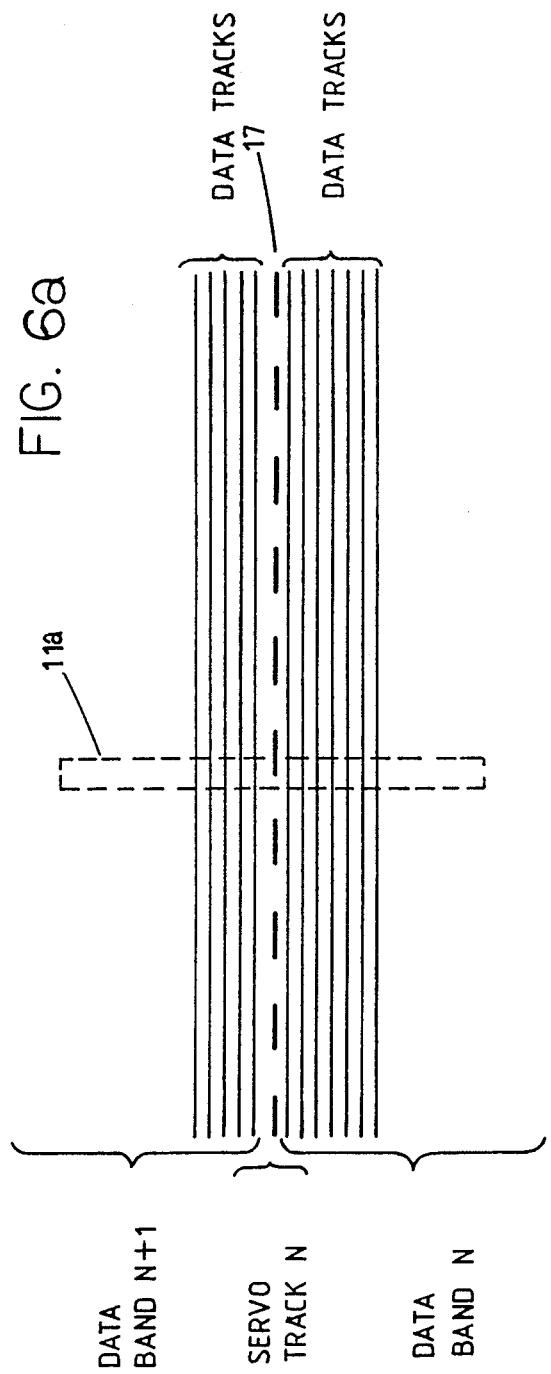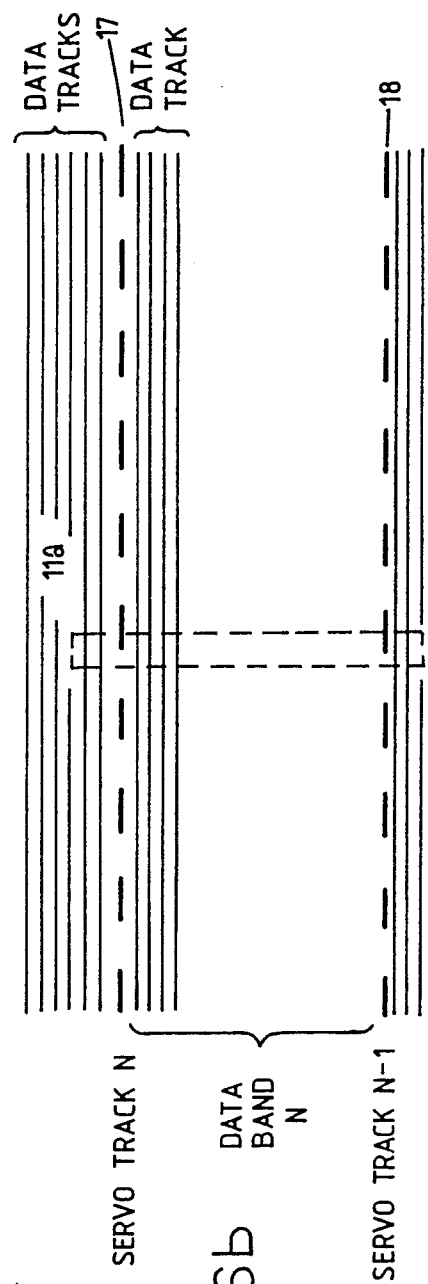

OPTICAL DISK FOR DETESTING AND DISTINGUISHING SERVO TRACKS FROM DATA TRACKS

This is a continuation of application Ser. No. 036,136, filed Apr. 6, 1987 which in turn is a continuation of Ser. No. 615,421 filed May 29, 1984 both abandoned.

CROSS REFERENCE INFORMATION

The subject matter of this application is related to copending U.S. patent applications Ser. No. 438,133, filed 11/01/82, and Ser. No. 503,955, filed 06/13/83, both assigned to the same assignee as is this application, and both of which are now abandoned. More particularly, this application describes and claims a system that is used to distinguish servo tracks from data tracks in an optical disk data storage system having a coarse servo system of the type disclosed in the above-cited applications.

BACKGROUND OF THE INVENTION

This invention relates to optical disk data storage systems, and more particularly to a system and method for detecting and distinguishing coarse servo tracks from data tracks in a coarse servo system of an optical disk data storage system.

Optical data storage systems that utilize a disk to optically store information have been the object of extensive research. Like their counterpart magnetic disk units, these optical disk storage units must have a servo system which controls the positioning of a read/write head to provide direct access to a given track of data recorded on the rotating disk Further, once a desired track has been accessed, the servo system must cause the read/write head to accurately follow this track while it is being read or when data is initially written thereon to.

To date, most of the prior art optical storage systems have had one of three types of servo systems physical groove, external encoder or optical feedback. The simplest of the systems is the physical groove as is shown, for example, in U.S. Pat. Nos. 4,260,858 and 3,654,401. In such systems, the optical disks are provided with physical grooves either in a spiral or circular pattern, and an optical read/write head is provided with a stylus or other physical means of engaging the groove. There are several drawbacks associated with this type of system. First, wear is a significant factor. Typically, the disks are formed using dies or molds, which dies or molds are subject to wear during the manufacturing process, hence necessitating their replacement and creating tolerance problems in the formed disks. Physical contact with the head guide stylus during use also causes disk wear, introducing noise. Further, rapid access involving radial movement of the head is difficult to accomplish.

One known approach to overcome the problems associated with the physical groove systems is to dedicate an entire data disk surface to servo tracks. This approach has worked well in magnetic disk systems, where a plurality of magnetic disks are usually provided in a stacked disk pack with a common spindle. The use of one disk surface for servo tracks does not seriously detract from the data storage capacity of such a system. Optical disk systems, on the other hand, in order to be suitable for use in a commercial environment, desirably have only one disk on a spindle with at most two surfaces available for recording both the data and servo information. It is not feasible, therefore, to dedicate an entire optical disk surface to servo tracks without severely sacrificing data storage capacity.

While magnetic disk servo systems can be adapted for use with optical disks, this approach is also very inefficient. Data track density can be made much higher in optical recording systems than in magnetic disk systems. Optical systems are capable of recording in an extremely narrow data track approaching one micron in width. This allows an increase in track densities on the order of 15 times the densities used in state of the art magnetic disk systems. An extremely accurate and sensitive servo system must be used to position the read/write head over such a track.

The optical disk systems that have heretofore provided the highest capability have employed optical feedback for tracking. Changes in reflected or transmitted illumination received from the disk are monitored by appropriate equipment. Illumination changes indicate the occurrence and direction of an off-track condition. Appropriate circuitry senses the change and activates a galvanometer controlled mirror in the light path steering the light beam(s) in the appropriate direction to continue track following. Such tracking systems can be extremely accurate and responsive but have range limitations on the order of 100 microns. This limitation arises essentially from the optics through which the light travels between the mirror and the disk. Galvanometer mirror systems allow rapid random access within this range but the optical head must be moved across the disk to obtain access to wider areas. Modern data storage applications require fairly rapid access to any data storage area on the disk and thus require accurate track accessing over a range of many centimeters and accurate track following upon access.

Galvanometer type servo positioning systems typically access other tracks in one of three ways:

(1) after accessing a first track (the starting point), successively adjacent tracks are accessed, and identified, one at a time, until the desired track is reached, (2) after identifying the track presently accessed (the starting track), and the track to be accessed (the target track), a determination is made as to the number of tracks n between the starting track and the target track, and whereupon access is achieved by moving the head n tracks, as determined by counting the individual tracks between the starting and target tracks; locking onto each track successively as the count progresses; or (3) after identifying the starting and target tracks as in method (2) above, a velocity servo is enabled which achieves access by forcing the galvanometer to follow a prescribed velocity profile that steers the optical beam to the vicinity of the target track, whereupon the track identification is read to verify that the desired target track has been reached.

Access method (1) above is extremely slow. Method (2), on the other hand, provides faster access and can be realized with relatively simple counting circuitry. Method (3) provides the fastest access, but also requires the most complex circuitry for its realization. All three methods however, are limited to the range of the galvanometer system, and do not, therefore, provide the needed rapid random access to all portions of the disk.

It is also a desirable feature in commercial optical disk systems to provide a removable/replaceable disk. This allows disks to be readily changed so that information recorded on different disks can be easily accessed. In a removable/replacement disk system, gross errors in alignment (up to several hundreds of microns) of the disk with respect to the head are unavoidable. Such alignment errors will typically exceed the 100 micron tracking radius of most galvanometer systems. It is therefore necessary to provide a servo system which will compensate for these gross errors and which will reliably position the read/write head with direct access over a large area of the optical disk.

Various systems have been developed to improve random access, or compensate for gross positional errors, or both. For example, U.S. Pat. No. 4,094,010 utilizes plurality of fixed read/write heads spanning an entire disk surface Each head is associated with a single servo track and a band of data tracks. While rapid access is assured by such a system, the plethora of tracking heads and ancillary equipment required greatly increases the cost and complexity of the system. The optical systems of U.S. Pat. Nos. 4,275,275, 4,160,270 and 4,282,598 each develop a coarse tracking error signal for use by a coarse positioning system to control head movement during tracking. The coarse track signal is developed from the tracking error signal generated by the galvanometer fine tracking system In U.S. Pat. No. 4,037,252 a coarse control signal is generated from the movement of the fine tracking galvanometer mirror itself as opposed to the signal developed from illumination data obtained from the disk. A significant drawback of these coarse positioning systems is that they do not decouple fine tracking errors from coarse tracking errors, thereby providing a less stable system. Moreover, these systems provide no improved direct random access capability.

Whatever the type of access and tracking system employed, some sort of detection means must be used to generate an error signal that can be used by the appropriate servo system to guide the positioning of the read/write head to a desired radial position with respect to the disk, and to maintain this desired position once reached. In the above-cited 438,133 application, a coarse/fine servo system is disclosed that achieves this purpose. Coarse servo tracks, selectively placed on the disk, allow the coarse servo system to access and track a relatively large band on the disk. The fine servo system is then used to access and track a desired data track within the band. More particularly, according to the teachings of the 438,133 application, by selectively placing spaced-apart coarse servo tracks on the disk, and then by illuminating through the read/write head an area of the disk large enough to always include a segment of one of these coarse servo tracks, the reflected radiant energy from the illuminated coarse servo track becomes a narrow strip of radiant energy that may be directed back through the read/write head to the surface of a detector array. The signal generated by the array can then be used as an error signal to indicate the location of the read/write head relative to a given coarse track. This error signal is used, in turn, by a coarse positioning servo system to place the read/write head at a desired location so as to provide the requisite coarse access and tracking capability.

The detector array disclosed in the above-cited 438,133 application represented the best mode of carrying out the invention disclosed therein at the time the invention was made. The 503,955 application discloses an improvement to this best mode, particularly with respect to the type of detector array that is used and the manner of processing and generating the error signal.

However, for the types of systems disclosed in the above-cited applications, a particular problem exists in that radiation incident to the array may be reflected from more than just the desired coarse servo track, e.g., from data tracks. These data tracks may or may not be present on the disk depending upon how "full" the disk is with respect to its data storage capacity. Some means is needed therefore to identify and distinguish the desired reflected radiation coming from the servo tracks from any undesired reflected radiation that may be present, such as that which comes from data tracks adjacent to servo tracks.

What is needed, therefore, is a detection system and corresponding storage disk that provides a means for distinguishing radiation that is reflected from only a desired coarse servo track, and not from adjacent data tracks.

SUMMARY OF THE INVENTION

It is an object of the present invention to provide an optical disk storage system that includes a means for optically detecting concentric coarse servo tracks on an optical disk used within such a system.

It is a further object of the invention to provide such a storage system wherein a reflected image of a segment of a coarse servo track placed on the optical disk used with the system, generated by illuminating an area larger that the width of the coarse servo track on the rotating disk, can be distinguished from reflected images of segments of data tracks or other non-coarse servo tracks lying in the same illuminated area.

Still another object of the present invention is to provide an information recording disk for use in an optical storage system wherein concentric servo positioning tracks placed on the disk prior to its use within such a system can be readily distinguished from concentric data tracks that are subsequently written or stored on the disk.

An additional object of the present invention is to provide a coarse servo detection method that responds only to radiation reflected from the coarse servo tracks, and that is insensitive to radiation reflected from other than the coarse servo tracks.

The above and other objects of the invention are realized by placing coarse servo tracks on an optical disk marked with an identifying pattern that allows radiant energy reflected therefrom to be readily distinguished from radiant energy reflected from data tracks or other areas on the surface of the disk.

The optical disk storage system with which the optical disk is used includes means for rotating the optical disk and means for controllably positioning a read/write head radially with respect to the disk, thereby allowing radiant energy, typically laser energy, passing through said read/write head to be directed to desired locations on the surface of the rotating disk. Such radiant energy is used to selectively mark (write) the disk with desired information, or to read the information already on the disk (sense radiant energy reflected from the previously-written marks).

As indicated above, the coarse servo positioning system includes a disk having coarse servo tracks placed on a surface thereof. These coarse tracks are used as markers or sign posts to guide the read/write head to a desired radial position with respect to a given coarse track Coarse illumination means directs radiant energy through the read/write head to the surface of the rotating disk. This radiant energy spans a wide enough area on the surface of the disk to ensure that at least a segment or portion of one coarse servo track is always illuminated. Reflected radiant energy from the surface of the disk therefore includes radiant energy reflected from the coarse track within the illuminated area. This reflected energy is directed back through the read/write head to a linear detection system.

Advantageously, the coarse servo track has a particular reflectivity pattern associated therewith such that radiation reflected therefrom can be uniquely distinguished from radiation reflected from other portions of the area illuminated by the coarse illumination means. Hence, by using appropriate discrimination means to identify the coarse servo track radiation, the linear detection system is able to generate an error signal having an amplitude that is proportional to the distance at which this coarse servo radiation falls on a collection surface of a detector used within the system. This distance is measured relative to a known reference point on the collection surface of the detector. This error signal is then used within a coarse servo system of the type described in the 438,133 and 503,955 patent applications, which coarse servo system positions and maintains the read/write head at a desired location.

In the preferred embodiment, the reflectivity pattern of the coarse servo track is a repetitive on/off (reflectivity high/reflectivity low) sequence such that when the disk is rotated at a constant speed, the reflected radiation from the coarse servo track assumes a pulsed condition having a known frequency. Once converted to a corresponding electrical signal, filtering techniques are used to distinguish this fixed-frequency radiation from other radiation.

As indicated above, the position error signal is used by the coarse servo positioning system as a feedback signal to control the radial position of the read/write head with respect to the disk. In a seek or access mode, the read/write head will be moved radially with respect to the disk until the read/write head is above or near a desired coarse servo track While so moving, the position error signal assumes a sawtooth waveform' each cycle of which corresponds to the movement of the head from one servo track to an adjacent servo track. Once a desired coarse servo track has been reached, a tracking mode is assumed during which the read/write head is held in a fixed position relative to the desired coarse servo track by monitoring the amplitude of the position error signal In one embodiment of the coarse positioning system, the read/write head is positioned directly over a desired coarse servo track. In another embodiment, the read/write head is positioned midway between two adjacent servo tracks.

BRIEF DESCRIPTION OF THE DRAWINGS

The above and other objects, features, and advantages of the present invention will be more apparent from the following more particular description thereof, presented in conjunction with the following drawings wherein:

FIGS. 6a and 6b conceptually illustrate alternative embodiments of the positioning of an illuminated strip or line on the surface of the disk with respect to a desired coarse servo track or a pair of coarse servo tracks;

DETAILED DESCRIPTION OF THE INVENTION

The present invention is best understood by reference to the accompanying drawings wherein like numerals will be used to describe like elements or parts throughout.

Figure 1:
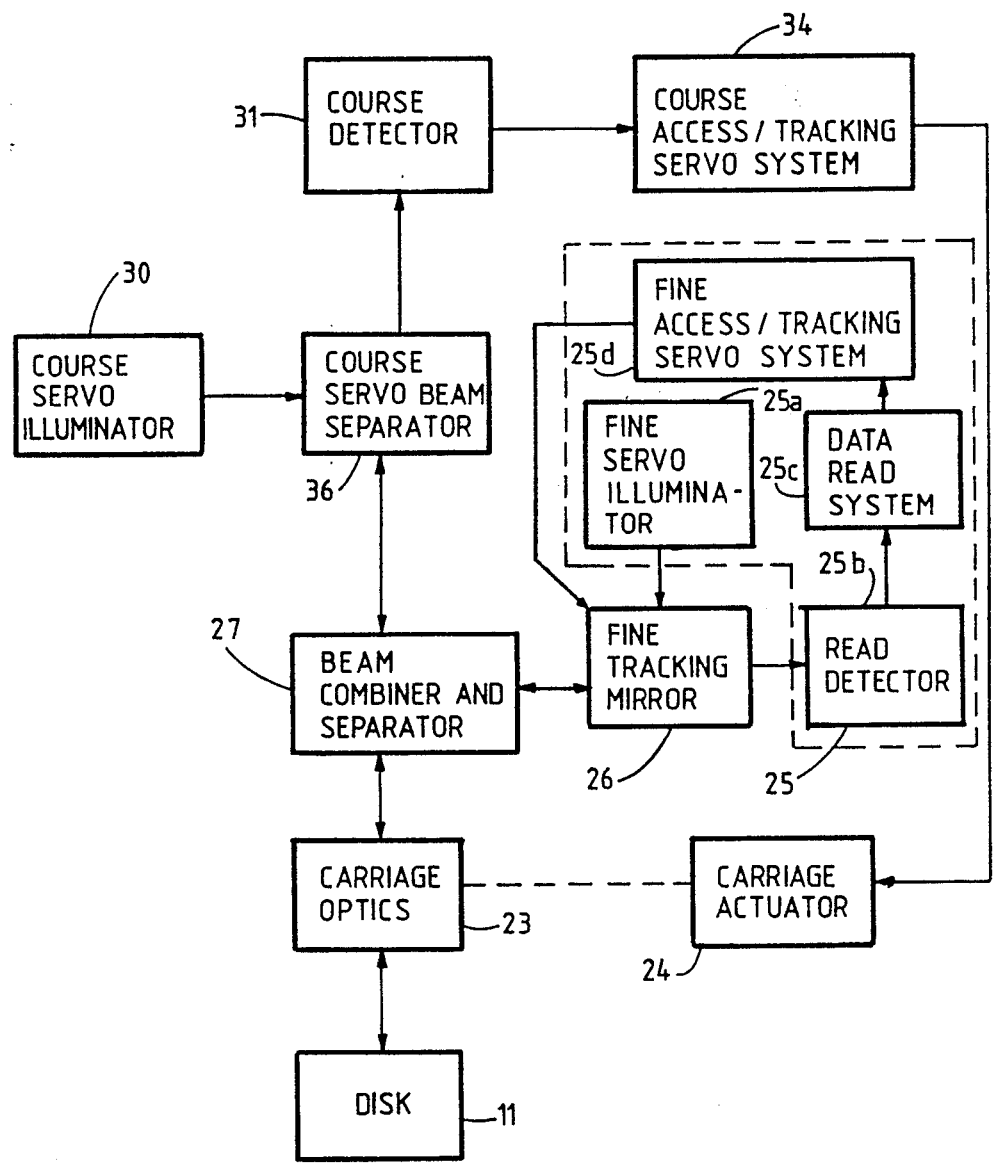
FIG. 1 is a block diagram of a coarse/fine servo system used in an optical disk data storage system, and illustrates the environment in which the present invention is designed to be used.

FIG. 1 shows a block diagram of a coarse/fine servo system of a type with which the present invention could be used. The various optical paths associated with the system shown in FIG. 1 are illustrated as bold lines, whereas electrical paths are indicated by fine lines. Mechanical coupling, as occurs between a carriage actuator 24 and the carriage optics 23, is indicated by a dashed line.

Figure 2:
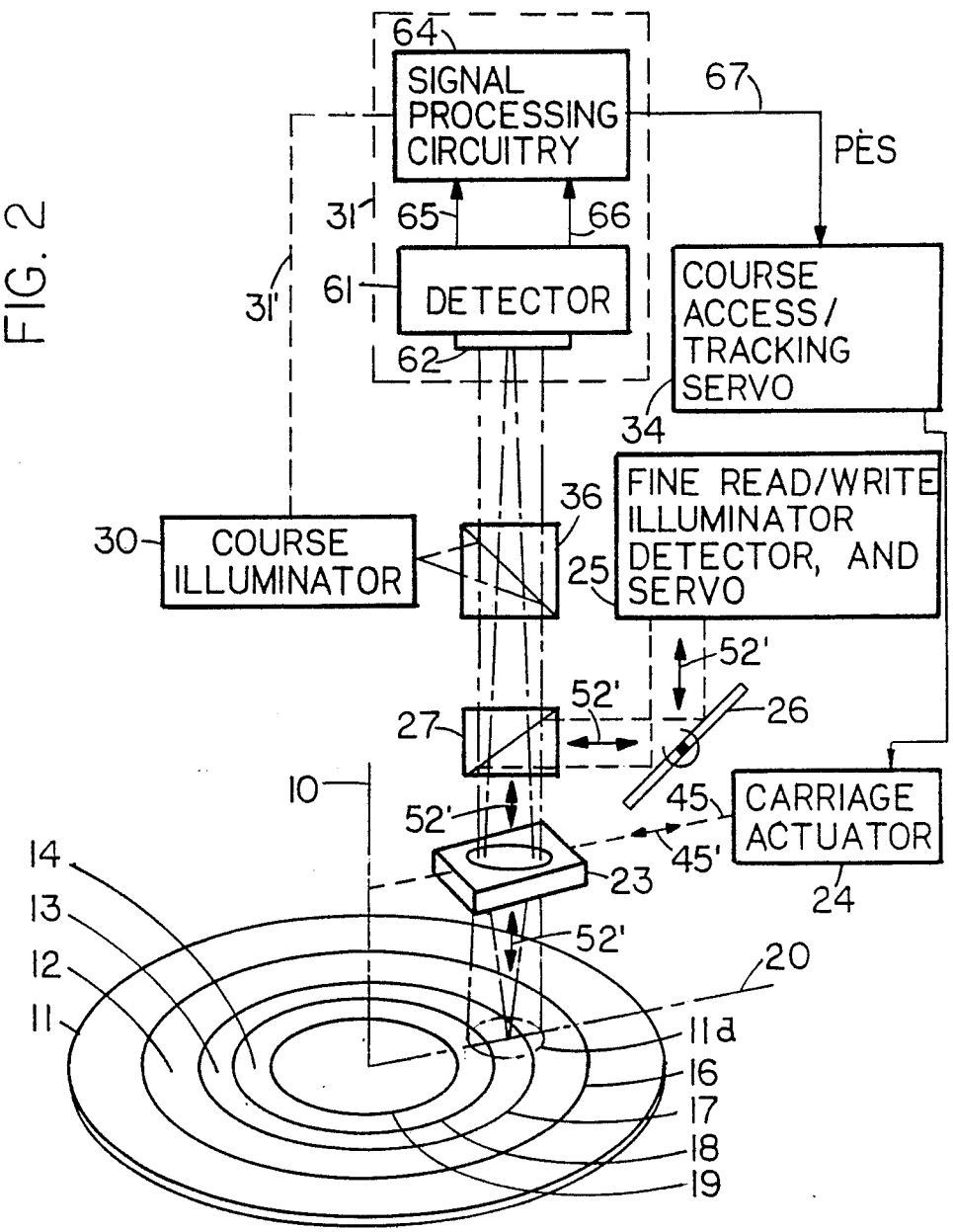
FIG. 2 schematically shows the principle elements of FIG. 1.

Referring next to both FIG. 1 and FIG. 2, the optical disk storage system can be explained. The system allows reading and writing from and to the surface of a disk 11 having a rotational axis 10 and a plurality of concentric data bands 12–14 (shown in FIG. 2). Each of the data bands includes a plurality of data tracks concentrically spaced about the rotational axis. The surface of the disk 11 has pre-recorded thereon, during manufacture, a plurality of optically readable servo tracks 16–19, concentrically and uniformly spaced about the rotational axis of the disk and positioned between the data bands.

The disk 11 is rotated about its axis 10 by conventional means. An optical read/write head, depicted by the carriage optics block 23, is positioned adjacent to the surface of the disk 11. Carriage actuator 24 selectively moves the read/write head along a radial axis 20 (FIG. 2), thereby moving the carriage optics 23 in a radial direction with respect to the disk 11 in order to access the data bands thereon. Mechanical motion of the carriage optics 23 is depicted in FIG. 2 as a dotted line 45, with motion being possible in both directions as indicated by the double headed arrow 45.

A fine read/write servo illuminator and detector 25 (FIG. 2) projects read or write light beam(s) 52' to the surface of the disk 11 so as to access data tracks thereon. In order to access the disk surface, this beam 52' is reflected by a fine tracking mirror 26, passes through a beam combiner and separator 27, as well as through the carriage optics 23. Included within the illuminator and detector 25 is a read detector 25b (FIG. 1) that reads light which has been reflected from the accessed recorded data track. This reflected light, also depicted as 52' in FIG. 2, passes through the carriage optics 23 and beam combiner and separator 27 before reaching the read detector 25b. The read detector converts this light to an equivalent electrical signal(s). This read electrical signal is, in turn, supplied to a data read system 25c, and to a fine access/tracking servo system 25d. As is explained more fully hereinafter, the beam depicted as the dashed line '52 in FIG. 2 actually comprises several read beams travelling in parallel paths (used for fine tracking and data reading), and may include a write beam, also travelling in a path parallel to the read beams. For simplicity, all of these beams or beam paths are depicted in FIG. 2 as a single beam 52'.

The servo system for access to and tracking of the coarse servo tracks includes a coarse illuminator 30 which projects light, represented as dashed double-dot lines in FIG. 2, through a coarse servo beam separator 36, a beam combiner and separator 27, and the carriage optics 23 onto a strip or line portion 11a of the disk surface (FIG. 2). An optical detector 31 detects reflected light, represented as dashed single-dot lines in FIG. 2, from the strip portion 11a of the disk surface. It is noted that the illuminated portion 11a of the disk surface spans at least the distance between two coarse servo tracks, and thereby always illuminates at least one coarse servo track For example, as shown in FIG. 2, light is reflected from the strip or line portion 11a of the disk 11 between and on either side of servo tracks 16 and 17 with an image of both servo tracks 16 and 17 being projected onto coarse detector and processing circuitry 31. This coarse detector and processing circuitry 31 is more fully described herein below with reference to FIGS. 11–14.

The output of the coarse detector and processing circuitry 31 is a coarse track position error signal (PES), which signal has an amplitude Proportional to the location at which the reflected radiation from the illuminated coarse servo track falls on the face of the detector 31. This error signal from the detector 31 is applied to a coarse access/tracking system 34. This system is connected in a servo loop with the actuator 24, which actuator moves the read/write head (represented schematically by the carriage optics 23) into radial proximity of a selected servo track so that the fine access and tracking system 25d can accurately position read or write beams on a selected data track.

As indicated previously, light reflected from a single data track on the disk is passed by means of the carriage optics 23, beam separator 27, and tracking mirror 26, and is detected by read detector 25b, the output of which is applied to the fine access/tracking servo system 25d. The read or write beams 52' from the illuminator 25a are moved radially with respect to the optical disk 11 by means of the tracking mirror 26, thereby providing for fine selective control of the beam's radial position. The tracking mirror 26, which may be a conventional galvanometer-controlled mirror(s), is controlled by the fine access/tracking servo system 25d.

Figure 5:
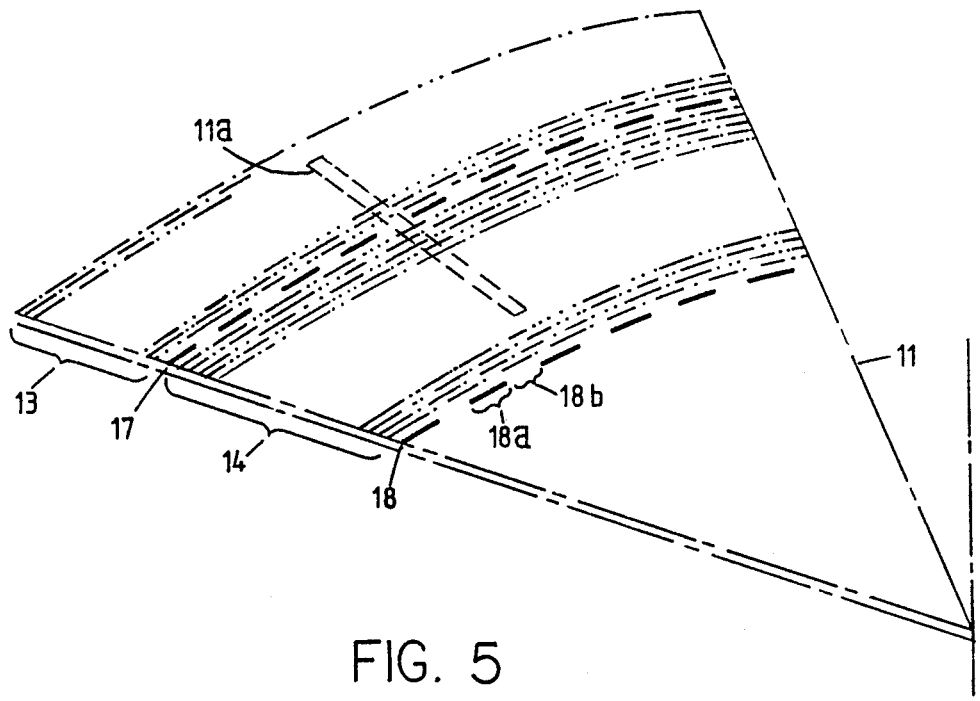
FIG. 5 is an expanded view of a segment of the optical disk surface and conceptually illustrates the reflectivity-high/reflectivity-low pattern placed in the coarse servo tracks.

In order to discriminate radiation reflected from servo tracks from that reflected from data tracks or other areas of the disk surface, the servo tracks of the preferred embodiment have an on/off (reflectivity-high/reflectivity-low) pattern placed therein that may be conceptually thought of as a dashed line, as shown best in FIGS. 5 or 6. This is explained more fully below. Further, the servo tracks are preferably three-to-five times the width of the data tracks The servo tracks provide improved data track following capability by providing coarse tracking control of the read/write head The coarse tracks are also used to permit rapid random access to a data band, regardless of whether any data has been recorded in the fine track area. (Note, a data band is that region of the disk surface between servo tracks.) This provides the ability to skip to randomly selected data bands for reading or writing. Seeking to a selected band may be accomplished by counting coarse tracks, in conjunction with analog or digital servo techniques commonly used in magnetic disk drives.

Figure 3:
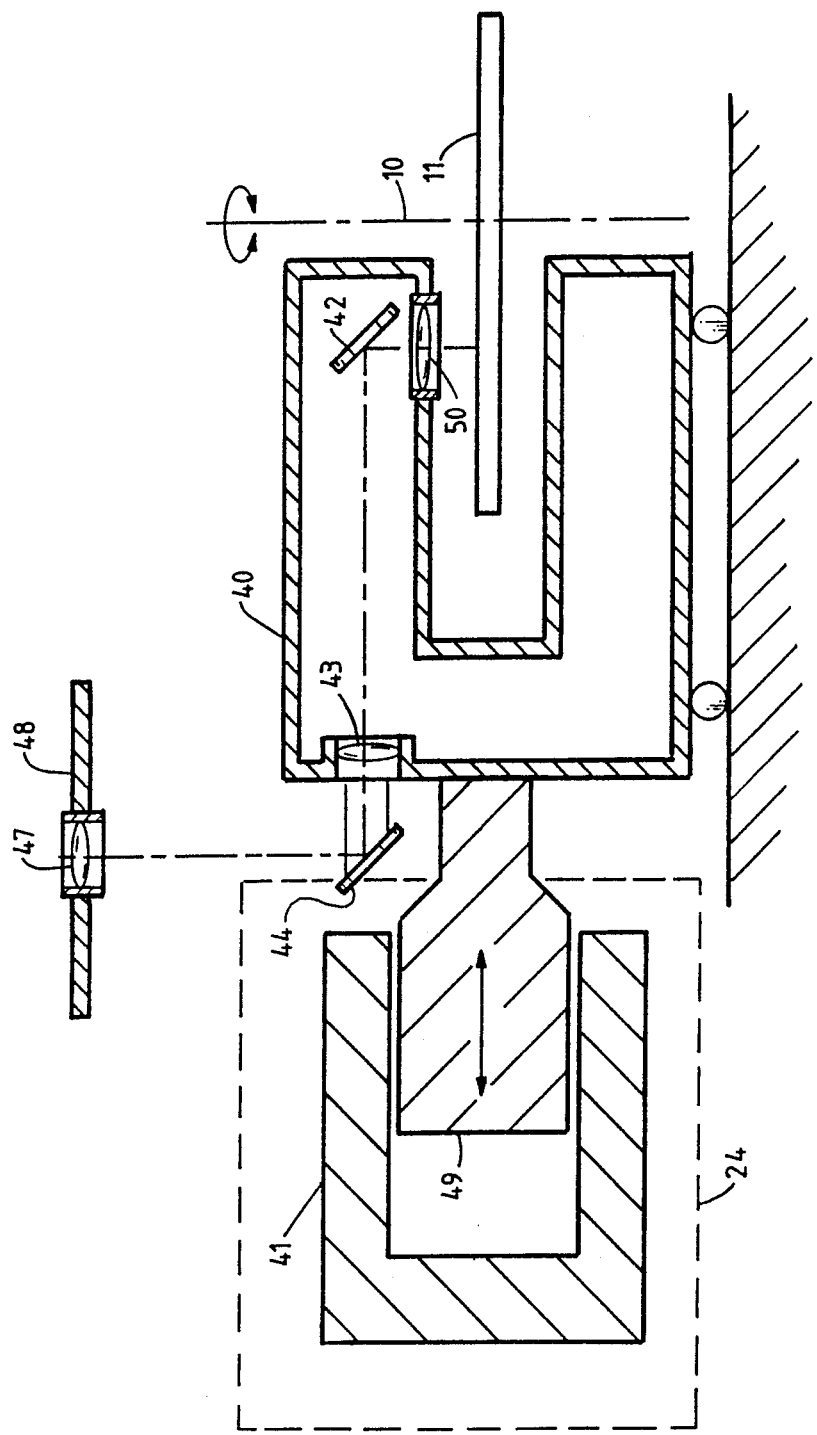
FIG. 3 is a side view of an optical disk drive and schematically shows the relationship between the optical disk, fixed and moving optics packages, and a linear actuator for controllably positioning the read/write head.

FIG. 3 is a side view that schematically shows the relationship between the optical disk 11 and a moving optics package 40 that is driven by the carriage actuator 24 into a read/write relationship with any of the tracks on the disk 11. The carriage actuator 24 may be realized with a linear motor, such as a voice coil motor, that includes a stationary magnet 41 and a moveable coil 49. The optical path for either the read or write light beam(s) to the surface of the disk 11 includes an objective lens 50, mirror 42, telescope lens 43, and mirror 44. Light is transmitted to and from the moving optics package 40 through a suitable optics package 47 mounted to a fixed optic plate 48 on which the remainder of the optics are mounted. The details associated with this optics package are not critically important to the present invention. Any suitable technique could be used within the optics package so long as the radiation reflected from the illuminated portion of the coarse track in the strip area 11a (FIG. 2) is directed to the coarse detector 31. However, a preferred embodiment of the optics used with an optical storage system in accordance with the present invention will be described in detail herein below with reference to FIGS. 7–10.

The Laser/Optical Components associated with the preferred Optical Drive Storage System with which the present invention is used are physically provided in two separate assemblies. The Fixed Optics assemblies are mounted to the frame and contain the following units as referenced in FIG. 7:

1. Write Laser Diode Module (WLD, L34, L35, L36, SH1, PR211, PR212, and M30)
2. HeNe Read Laser
3. Write Alignment Actuator (GA2)
4. Radial Tracking Actuator (GA1)
5. Complex Grating (GR21 and GR22)
6. Read Collimating Telescope (121 and L22)
7. Write Alignment Detector (D22)
8. Astigmatic Optics (L26, L27 and L28)
9. Read/Focus/Track Detector (D21)
10. Read/Write Beam Combiner (WB1)
11. Read/Write/Coarse Seek Beam Combiner (WB2)
12. Read Polarization Beamsplitter (PB1)

13. Write Polarization Beamsplitter (PB2)
14. Amplitude Beamsplitter (AB1)
15. Coarse Seek Laser Diode (CSLD)
16. Coarse Seek Polarization Beamsplitter (PB3)
17. Coarse Seek Detector (D23)
18. Fresnel Rhomb Prism
19. Associated mirrors, lenses, prisms, absorber, filters, shutter, and retarder plate The Moving Carriage Optics, mounted on the Moving Carriage, provide the other assembly Included in this assembly are:
1. Imaging/Beam Shaping Telescope (L23 and L24)
2. Objective Lens and Focus Actuator (L25)
3. Beam-Folding Mirror (M27)

Optical Components

The following paragraphs describe the optical components in detail and their functions with relation to both reading and writing on the disk platter. Reference designations are with reference to FIG. 7.

Read Laser

The HeNe laser provides the raw 633 nm wavelength beam required for read operations This gas laser source has a nominal output of 5 mW and produces a nominally collimated beam of light having a diameter of 0.83 mm. The raw beam is transmitted by Filter 21 and reflected by two mirrors (M21 and M22) onto a transmissive grating (Complex Grating). It then passes through a system of lenses, beamsplitters, and related optics before it is incident upon the disk.

F21 functions as a neutral density filter and absorbs or reflects some of the 633 nm light and transmits the rest through the system. It is 15 mm in diameter and 3 mm thick M21 and M22 are each 20 mm in diameter and 5 mm thick and have a 10–5 surface finish on the narrow central working aperture Complex Grating The Complex Grating Subassembly (GR21 and GR22) is a transmissive grating system which diffracts the raw HeNe laser beam into six separate beams of light. It actually consists of two gratings placed back-to-back which separate the incoming laser beam into an array of beams.

The initial beam is incident perpendicular to the grating substrate. Of the six exiting beams one is parallel to the optical axis; the other five beams come out at angles corresponding to the spacing of the rulings on the gratings. The first grating is a transmissive grating which diffracts power from the zero (undiffracted) order into the $\pm 1$ orders, thus providing three beams The second grating is a blazed transmissive grating which diffracts power into the $+1$ order; thus, it splits each of the three spots into a pair of spots. The net effect of the Complex Grating is, therefore, to form an array of six beams from the raw HeNe laser beam.

When these six beams are focused at the disk to form six spots, four are used to derive tracking error signals, two are used for reading, and one of the read spots is simultaneously used to derive a focus error signal. They are referred to as: Read Previous Track, Readback Check, and Tracking No. 1, No. 2, No. 3, and No. 4.

Read Collimating Telescope

The Read Collimating Telescope consists of two infinite conjugate doublets, L21 and L22. L21 has a focal length of 24 mm; L22 has a focal length of 252 mm. The telescope serves two purposes: to expand the six beams of light and to image the recollimated beams onto the Radial Tracking Actuator mirror (GA1 and M24). It works in conjunction with the Imaging/Beam Shaping Telescope to provide the necessary beam diameter and imaging at the objective.

After transmission through the collimating telescope which expands all six beams to a diameter appropriate for the carriage optics, the beams are incident upon folding mirror M23. The mirror, which is 24 mm in diameter and 5 mm thick, reflects the beams through the system to the Radial Tracking Actuator mirror M24 which is positioned at an image plane of the grating.

Read Polarization Beamsplitter

The Read Polarization Beamsplitter (PB1) is a polarization sensitive cube beamsplitter with a dimension of 15 mm on each side. It is coated on the diagonal and directs the read beam depending upon its path, to or from the disk. Headed towards the disk the read beam is S polarized whereas the return beam is P polarized. The incoming beam reflects off the beamsplitter and passes onto the Read/Write Beam Combiner. The reflected beam is transmitted through the Read Polarization Beamsplitter to the Read/Focus/Track Detector train.

Read/Write Beam Combiner

The Read/Write Beam Combiner WB1 is a wavelength beam combiner. It is a cube with a dimension of 15 mm on each side. The combiner is coated with a on the diagonal to transmit the 835 nm wavelength of the infrared Write Laser Diode and reflect the 633 nm wavelength of the read HeNe laser. This special coating on the combiner allows the read and write beams to be combined efficiently on their way to the disk.

The read beam is reflected by the Read Polarization Beamsplitter onto the Read/Write Combiner. The write beam is transmitted by the Write Polarization Beamsplitter onto the Read/Write Combiner. The combined beams are then incident upon the Amplitude Beamsplitter.

The Read/Write Combiner acts as a beamsplitter with respect to the returning read and write beams. The returning write beam passes through the combiner and is sent back to the Write Polarization Beamsplitter. The returning read beam is again reflected off the combiner and transmitted by the Read Polarization Beamsplitter to the Read/Focus/Track Detector.

Amplitude Beamsplitter

The Amplitude Beamsplitter (AB1) is a cube beamsplitter with a dimension of 15 mm on each side. It has a dielectric coating which causes most of the 633 nm read light and 835 nm write light to be transmitted through the diagonal. A small fraction of both the read and write light is reflected by the beamsplitter.

Coming from the Read/Write Combiner the incoming combined beams reach the Amplitude Beamsplitter. The beamsplitter reflects a small portion of the read and write beams down to the Write Alignment Detector which measures their relative alignment. The larger portion of each beam is transmitted by the beamsplitter and goes onto the Carriage Optics.

Most of the light from both the returning read and write beams is transmitted back through the Amplitude Beamsplitter. A minute portion of light from both beams is reflected off the beamsplitter and is not used.

Radial Tracking Actuator

The Radial Tracking Actuator (GA1) is a galvanometer with Mirror M24 mounted on it. It works in conjunction with the Read/Focus/Track Detector to maintain radial alignment of the read beam with respect to tracks on the disk.

As previously described the Read Collimating Telescope images the Complex Grating onto the galvanometer mirror which is a rectangle 13 mm by 17 mm. The mirror is positioned on the galvo so that the face of the mirror pivots about the center of the 17 mm dimension. The effect of the collimating telescopic action is to reduce the mirror weight and size. It, therefrom, minimized the galvanometer moving mass. The reduction in mass produces a fast response time in terms of maintaining alignment and increases the capability of writing at an extremely high data rate.

The galvanometer mirror is imaged by the Imaging-/Beam Shaping Telescope so that the image is placed at the entrance pupil of the Objective lens. If the grating and galvanometer are correctly imaged, the aperture is properly filled, allowing the maximum amount of light to pass through the Objective Lens (L25) and focus on the disk.

Read/Write/Coarse Seek Combiner

The Read/Write/Coarse Seek Combiner (WB2) is a wavelength beam combiner. It plays a significant role in the optical system. It combines the HeNe beam, Write beam and Coarse seek beam and sends the combined beam to the Carriage Optics. In actuality, it is a plate beamsplitter 20 mm in diameter, 5 mm thick, and is coated to manage both the parallel and perpendicular polarizations of the three beams directed towards the disk and the flipped polarizations of the returning beams.

The front surface of the combiner reflects the 835 nm write light and the 633 nm read light while the antireflection coating on the rear transmits the 780 nm coarse seek beam. The read and write beams reflected by the Radial Tracking Actuator are also reflected by the combiner while the coarse seek beam is transmitted. Thus, the three beams are combined and transmitted by the rhomb prism and to reach the Carriage Optics.

With respect to the returning beams the combiner acts like a beamsplitter. The three reflected beams reach the combiner. The read and write beams reflect off of it and are sent to the Radial Tracking Actuator. The coarse seek beam is transmitted and sent down to the Coarse Seek Detector.

Rhomb Prism

The Fresnel Rhomb Prism (RH21), rhomboidal in shape, functions as an achromatic quarter wave plate. It is a parallelogram in cross section, the angle of the parallelogram being approximately 55°. The front face of the prism is a square aperture, 20 mm on a side.

The prism works in conjunction with the polarization sensitive beamsplitters to direct the paths of the beams. Each of the three laser beams enters the prism perpendicular to its front face. Once in the prism the linear polarization of each beam is changed to a circular polarization. When the beams reflect back from the disk the circular polarization is rotated. The rotated circularly polarized wavefronts are changed into linearly polarized wavefronts when transmitted through the rhomb but with linear polarizations at an angle 90° to what they were previously.

Mirror M25 reflects the beams into and out of the prism. It is 24 mm in diameter and 5 mm thick. Mirror M26 receives the beams from M25 and makes them collinear with the optical axis of the carriage optics. It is 30 mm in diameter and 5 mm thick.

Imaging/Beam Shaping Telescope

The Imaging/Beam Shaping Telescope consists of two infinite conjugate lenses, L23 and L24. L23 is an achromatic doublet with a focal length of 86.4 mm. L24 is also achromatic and has a focal length of 39.3 mm. Mirror M27 is a Beam-Folding Mirror which passes the beam from L23 to L24. It is 12 mm in diameter, 3 mm thick and reflects the 633, 780, and 835 nm wavelengths equally. Additionally, it reflects the S and P polarizations equally.

The primary purpose of the telescope is change the beam diameters to match the entrance pupil of the Objective Lens. If the diameters are correct the aperture of the Objective Lens is properly filled and the maximum amount of light can pass through the lens to focus on the disk. The beam coming out of L24 and reaching the Objective Lens has been demagnified 2,2 to 1 since leaving the galvanometer mirror. The second function of the telescope is to image the Radial Tracking Actuator mirror into the pupil of the objective lens.

Objective Lens

L25 is the objective lens which focuses the read, write and coarse seek beams on the disk. It is a circular lens with a 0.60 numeral aperture and an entrance pupil diameter of 4.22 mm. The collimated light coming into the lens is focused at the disk. The lens is mounted into the focus actuator which is responsible for the correct spatial distance between the objective and the disk.

The focus actuator maintains focus within an accuracy of ±12 microns Essentially, it is a wire wrapped tube surrounded by magnets. Current passing through the coil creates an electromagnetic field determining the distance and direction of the tube movement. Tube movement shifts the lens with respect to the disk when signals are received from the Track Detector electronics. A spring mechanism prevents extreme movements either towards or away from the disk.

Astigmatic Optics

The Astigmatic Optics consists of three lenses: L26, L27, and L28. They are located on the Read/Focus/-Track Detector train between the Read Polarizing Beamsplitters and the Read/Focus/Track Detector L26 is an achromatic doublet with a positive focal length of 240 mm. L27 is a spherical lens with negative focal length of −125 mm. L28 is a cylindrical lens with a positive focal length of 250 mm. L26 and L27 work together to form a front spherical lens for a standard astigmatic optics system. L28 receives the circular beam from L27 and introduces an astigmatism so that the spatial pattern of the beam is sensitive to small amounts of defocus of the objective lens with respect to the disk.

All six read beams pass through the astigmatic optics to reach the Read/Focus/Track Detector. To illustrate how the Astigmatic Optics are used note that the Read Previous Track spot reflects from the disk and passes through the Astigmatic Optics to reach the Read/-Focus/Track Detector. Because L28 is cylindrical it produces two focal planes, each oriented on a different axis. If the spot at the disk is in focus it passes through L26, L27, and L28 and produces a circularly symmetric blur circle between the two axes at the Read/Focus/-Track Detector plane. If the spot is out of focus at the disk it passes through the Astigmatic Optics and produces an ellipse in either a positive or negative direction, causing a focus error signal to be generated. Refer to FIG. 4–16.

Read/Focus/Track Detector

The Read/Focus/Track Detector (D21) is an array of detectors which receives read signals reflected from the disk and converts the reflected signals into read data, focus error information, and fine tracking information. It provides a signal for the Radial Tracking Actuator to keep the Read beam radially aligned with the disk. A reflected read beam from the disk passes through the Astigmatic Optics and Filter F22 and reaches the Read/Focus/Track Detector. If the read beam is improperly positioned on a fine track or is off track the detector receives the information and converts it into an electronic signal. The signal causes the Radial Tracking Actuator mirror to pivot to realign the beam.

D21 consists of a single chip with nine separate photosensitive elements. Five of the elements are circular with a diameter of 1.20±0.05 mm. The additional four elements form a quad array, each element being square and 0.44 mm on a side. The diameter of each light spot on the array elements is 0.8 mm.

F22 is located on the Read/Focus/Track Detector train in close proximity to the detector. It transmits greater than 98% of any infrared light. F22 prevents any stray 835 nm wavelength light from returning through the system to the Read/Focus/Track Detector. The filter is 15 mm in diameter and 3 mm thick.

Write Laser Diode Module

The Write Laser Diode Module is a Field Replaceable Unit which consists of the Write Laser Diode (WLD), Collimator Lens L34, Shutter SH1, the Prism Beam Expander (PR211, M30 and PR212) and a Collimating Telescope (L35 and L36). The module components produce a circularly symmetric beam for recording on the disk. The following paragraphs detail each of the components.

Write Laser Diode

The Write Laser Diode (WLD) is a 20 mW infrared light source with a wavelength of B35 nm (Tables A-1 through A-3). It is the beam which makes marks or pits on the disk platter surface. The elliptical beam is emitted from the rectangular laser facet, is collimated, and made circularly symmetric as it goes through the module prisms and lenses.

Write Beam Collimator Lens

The Write Beam Collimator Lens (L34) is a spherical lens which collects and collimates the light from the laser diode facet. It has the same specifications as Objective lens L25 with a 0.60 numeral aperture and an entrance pupil of 4.22 mm.

Shutter

The Shutter (SH1) is a mechanical device which slides vertically in front of L34. It takes approximately 5 msecs to open. When open the full power of the write laser beam is transmitted through the system to make marks on the disk. When closed the shutter filter permits a small fraction of light to travel through the system. The light, however, does not write on the disk because the power of the light is greatly diminished by the shutter filter. The shutter must be closed to insure an accurate measurement of the radial alignment between the write and Read Previous Track spots. If the shutter were open during a measurement the full power of the write laser would be incident upon the disk and unwanted marking of the disk would occur.

Prism Beam Expander

The Prism Beam Expander (PR211, M30 and PR212) consists of two reflecting prisms and a mirror M30 which reflects the P polarization of the 835 nm write light with high efficiency. The entering face of PR211 and the exit face of PR212 are both 16 mm by 8 mm. Both prisms have a thickness of 8 mm. The included angle between the entering and exit faces varies between 40° and 50° depending upon the laser diode.

The subassembly produces a circularly symmetric beam from the elliptical beam entering the front face of PR211. The narrow dimension of the elliptical spot is expanded as it is transmitted through the prisms while the wide dimensions of the beam remains unchanged. Refraction through the prisms produces the circularly symmetric beam leaving the exit face of PR212.

Collimating Telescope

The Collimating Telescope consists of two spherical doublets, L35 and L36. The purpose of the telescope is to expand the collimated circular beam which comes out of the Prism Beam Expander to the diameter appropriate for the Carriage Optics. The expanded beam is then incident upon the Write Alignment Actuator.

L35 and L36 are specially selected to accommodate the varying divergence angles of laser diodes L35 ranges in focal length from 40 to 50 mm, and L36 from 120 to 148 mm; the effect of these ranges is to allow the Collimating Telescope to vary in magnification from 2.4 to 3.7X.

Write Alignment Actuator

The Write Alignment Actuator (GA2) is a galvanometer with mirror M31 mounted on it. The actuator provides radial alignment of the write beam to the read beam. It receives electronic signals from the Write Alignment Detector indicating misalignment. If misalignment occurs the galvanometer mirror M31 is tilted to reposition the write beam and correct alignment.

M31 is rectangle 13 mm by 17 mm. It pivots about the center of the 17 mm dimension.

Write Alignment Detector

The Write Alignment Detector (D22) senses radial misalignment of the write beam with respect to the read beam. It is manufactured by United Detector Technology, Model PN SC-4D, with an active surface of 2.5 mm by 2.5 mm. The detector provides two-dimensional error information for the radial position error between the read and write beams. Both the Readback Check spot and the write spot are imaged upon this detector when the shutter is closed at which time the detector senses the radial distance between the two. Based on that distance the detector sends an error signal to the Write Alignment Actuator to realign the write beam to the read beam.

Write Alignment Lens Subassembly

The Write alignment Lens Subassembly includes spherical lenses L29 and L30. They are located between the Amplitude Beamsplitter and the Write Alignment Detector. L29 has a positive focal length of 240 mm; L30 has a negative focal length of −49 mm. The lenses are 250 mm from each other and operate as a single telephoto lens with an effective focal length of 1000 mm. They form an image at the Write Alignment Detector of the Write and Readback Check spot. The lenses are designed so that the other five read spots are not incident upon the Write Alignment Detector.

Write Polarization Beamsplitter

The Write Polarization Beamsplitter (PB2) is a polarization sensitive cube beamsplitter with a dimension of 15 mm on a side. It can accommodate wavelengths ranging from 820 to 850 nm. Directed towards the disk the write beam is P polarized, is transmitted through the Write Polarization Beamsplitter and reaches the Read/Write Combiner. After reflection at the disk the return beam again passes through the Rhomb Prism and becomes S polarized. It reflects off the polarization sensitive beamsplitter and onto an Absorber.

Coarse Seek Laser Diode

The Coarse Seek Laser Diode (CSLD) is a 5 mw infrared light source with a 780 nm wavelength. Unlike the pulsed Write Laser Diode it is continuously driven. The beam is emitted from a rectangular laser facet, is collected by L31, and becomes astigmatized as it passes through L32.

The coarse seek beam forms a line focus at the disk and upon reflection, returns to the Coarse Seek Detector, indicating the position of the objective lens relative to the center of a particular coarse track. The Detector converts the image into carriage position error information which is relayed to the Voice Coil Motor to appropriately reposition the carriage.

Coarse Seek Lenses

The coarse seek lenses consist of L31, L32 and L33. Together L31 and L32 provide an illumination profile at the disk. L31 is an 18X objective which nominally collimates the elliptical beam coming from the Coarse Seek Laser diode. L32 is a cylindrical lens with an effective focal length of 200 mm. It receives the elliptical beam and astigmatizes it to form the proper line focus needed at the disk.

L33 is a spherical lens with a nominal focal length of 243 mm. It sees the reflected beam and works in conjunction with the carriage telescope to form an image plane of the disk on the Coarse Seek Detector Coarse Seek Polarization Beamsplitter The Coarse Seek Polarization Beamsplitter (PB3) is a polarization sensitive cube beamsplitter with a dimension of 15 mm on a side. Going towards the disk the coarse seek beam is S polarized so it is reflected by the Coarse Seek Polarization Beamsplitter to the Read/Write/Coarse Seek Combiner. After reflection at the disk and a second transmission through the Rhomb, the beam is P polarized so it is transmitted by the polarization beamsplitter and is incident upon the Coarse Seek Detector.

Retarder Plate

The Retarder Plate (RP1) is a quartz retarder plate of multiple order to accommodate the wavelength variations coming from the Coarse Seek Laser diode. It changes the direction of polarization and works in conjunction with the Rhomb Prism to achieve the right degree of polarization for the coarse seek beam to correctly illuminate the disk and form an image plane on the Coarse Seek Detector. The convergent/divergent light in the uncollimated coarse seek beam produces unequal polarization changes when passing through the Rhomb. The Retarder Plate works with the quarter wave plate action of the Rhomb to properly adjust the polarizations.

Filter F23 and Mirror M29

Filter F23 is located between the Coarse Seek Detector and the Coarse Seek Polarization Beamsplitter. It is 15 mm in diameter and 3 mm thick. It transmits the coarse seek beam with greater than 94% efficiency and blocks 98% of 835 nm light. M29, located between the Retarder Plate and Read/Write/Coarse Seek Combiner reflects the coarse seek beam into and out of the Carriage Optics. Additionally, it transmits all but a fraction of 633 nm light and so prevents the HeNe light from being incident upon the Coarse Seek Detector. The mirror transmits 633 nm wavelengths through its coating and scatters the light off its rear surface. Any stray 633 nm light reflected from the mirror is blocked by F23 and prevented from forming an image on the Coarse Seek Detector.

Coarse Seek Detector

The Coarse Seek illumination pattern at the disk is imaged at the Coarse Seek Detector which senses carriage radial position error. If the objective lens is on the optical center a null signal is sensed. If the lens is off center a positive or negative signal is sensed. The detector relays this information to the Voice Coil Motor which repositions the carriage. Additionally, the coarse seek detector allows counting of coarse tracks during a coarse seek.

D23 is a one-dimensional position sensing detector manufactured by United Detector Technology, Model LSC-5D. The active area on the detector is 5.33 mm long by 2.2 mm wide. The disk plane is imaged onto the detector and fills the entire surface area.

Read Path to Disk

Figure 7:
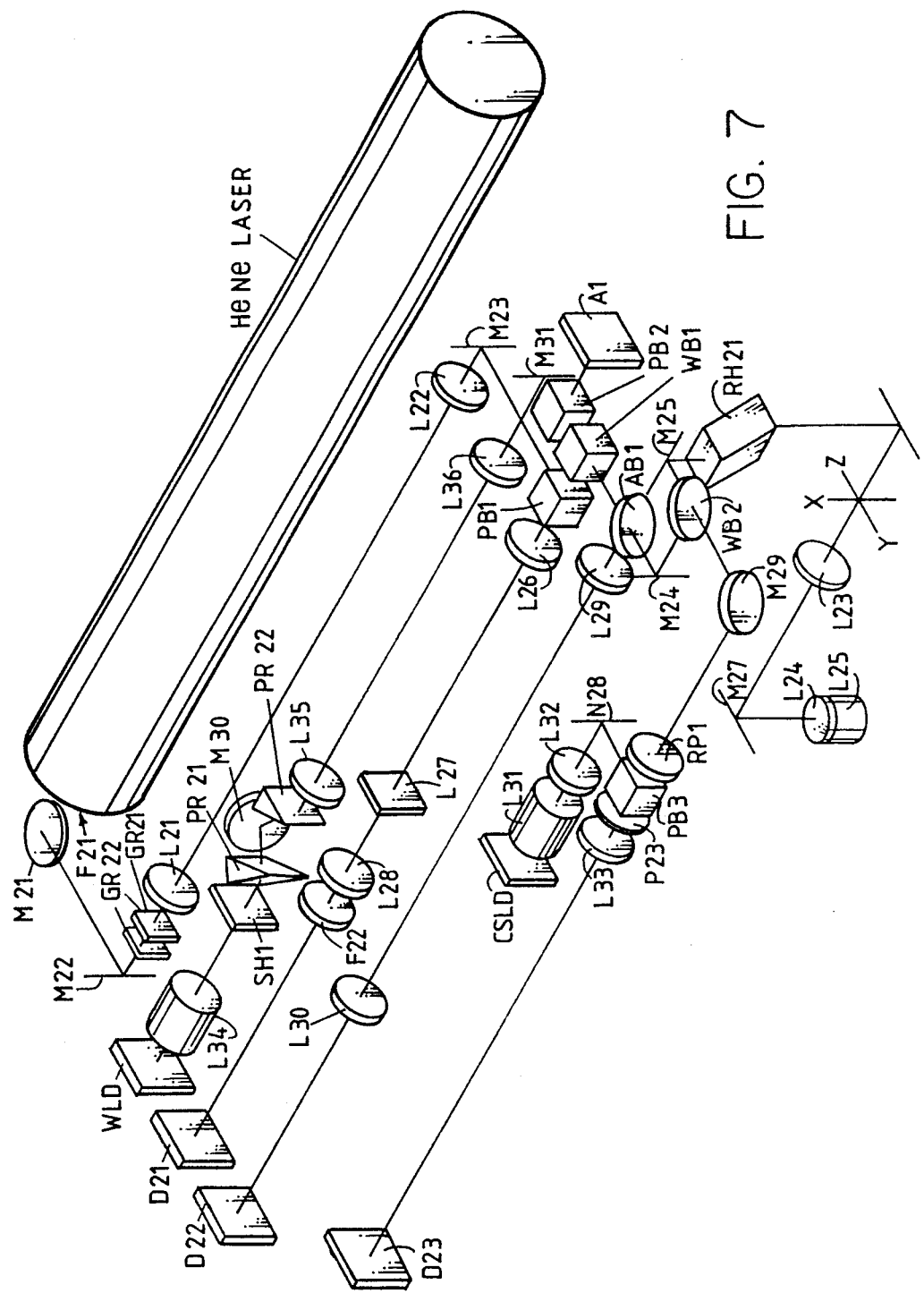
FIG. 7 is an optical schematic diagram of all the optical components used in connection with the preferred embodiment of the optical disk storage system within which the present invention is used.
Figure 8:
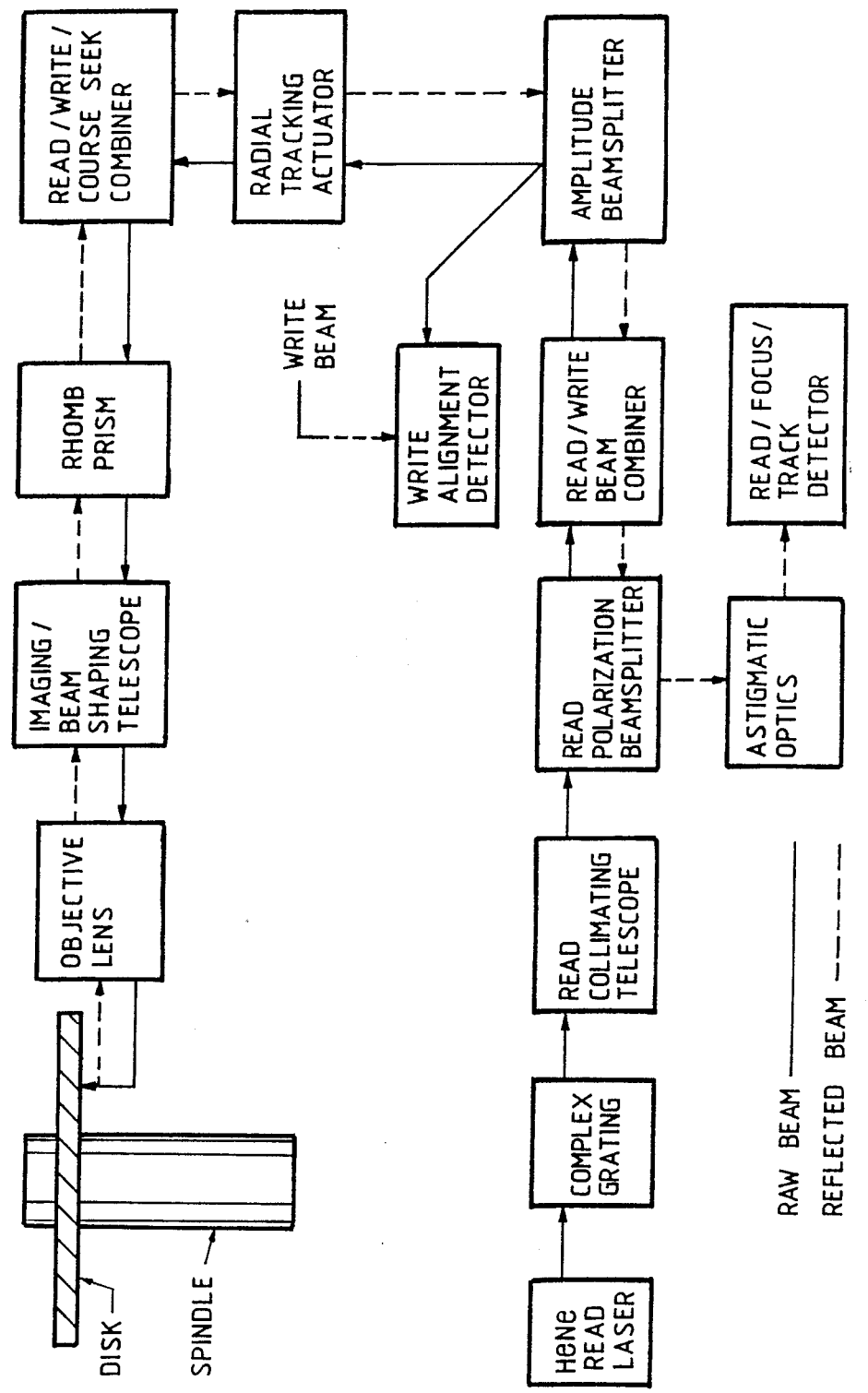
FIG. 8 is a block diagram of the Read Optics portion of FIG. 7.

Referring to FIGS. 7 and 8, the 633 nm wavelength HeNe beam leaves the laser housing, is reflected by Mirror M21, transmitted by Filter F21, and reflected by Mirror M22. It is transmitted by the Complex Grating subassembly (GR21 and GR22) which divides the beam into six collimated beams of light which are then expanded by the Read Collimating Telescope (L21 and L22). The light is reflected by Mirror M23, by the Read Polarization Beamsplitter (PB1) and the Read/Write Beam Combiner (WB1). It is transmitted by the Amplitude Beamsplitter (AB1) which directs a small percentage of the read light out of the main path through lenses L29 and L30 to the Write Alignment Detector (D22).

The read beams transmitted by the Amplitude Beamsplitter are reflected by the Radial Tracking Actuator mirror (GA1 and M24) which is at an image plane of the Complex Grating. The read light is then reflected by the Read/Write Coarse Seek Combiner (WB2) and Mirror M25, and transmitted through the Rhomb Prism (RH21). It is reflected by Mirror M26 to the Carriage Optics which consists of the imaging/Beam Shaping Telescope and the Ream-folding Mirror (L23, L24 and M27). Finally, the beams enter the entrance pupil of the Objective Lens (L25) through which they are focused to read data from the disk platter.

Read Path From Disk

The Read beams reflected from the disk are collected by the Objective Lens (L25) and are transmitted by the Imaging/Beam Shaping Telescope and Beam-folding Mirror (L23, L24 and M27). They are reflected by Mirror M26 and transmitted through the Rhomb Prism (RH1). Once through the prism they are reflected by the Read/Write/Coarse Seek Combiner (WB2) and the Radial Tracking Actuator mirror (GA1 and M24), are transmitted through the Amplitude Beamsplitter (AB1) and reflected by the Read/Write Beam Combiner (WB1). Due to a 90° rotation of polarization caused by the return pass through the Rhomb Prism (RH1), the returning read beams are transmitted through the Read Polarization Beamsplitter (PB1). The beams are then sent to the Read/Focus/Track Detector train which consists of the Astigmatic Optics (L26, L27 and L28), and Filter F22. The beams are all finally incident upon the Read/Focus/Track Detector (D21).

Write Path to Disk

Figure 9:
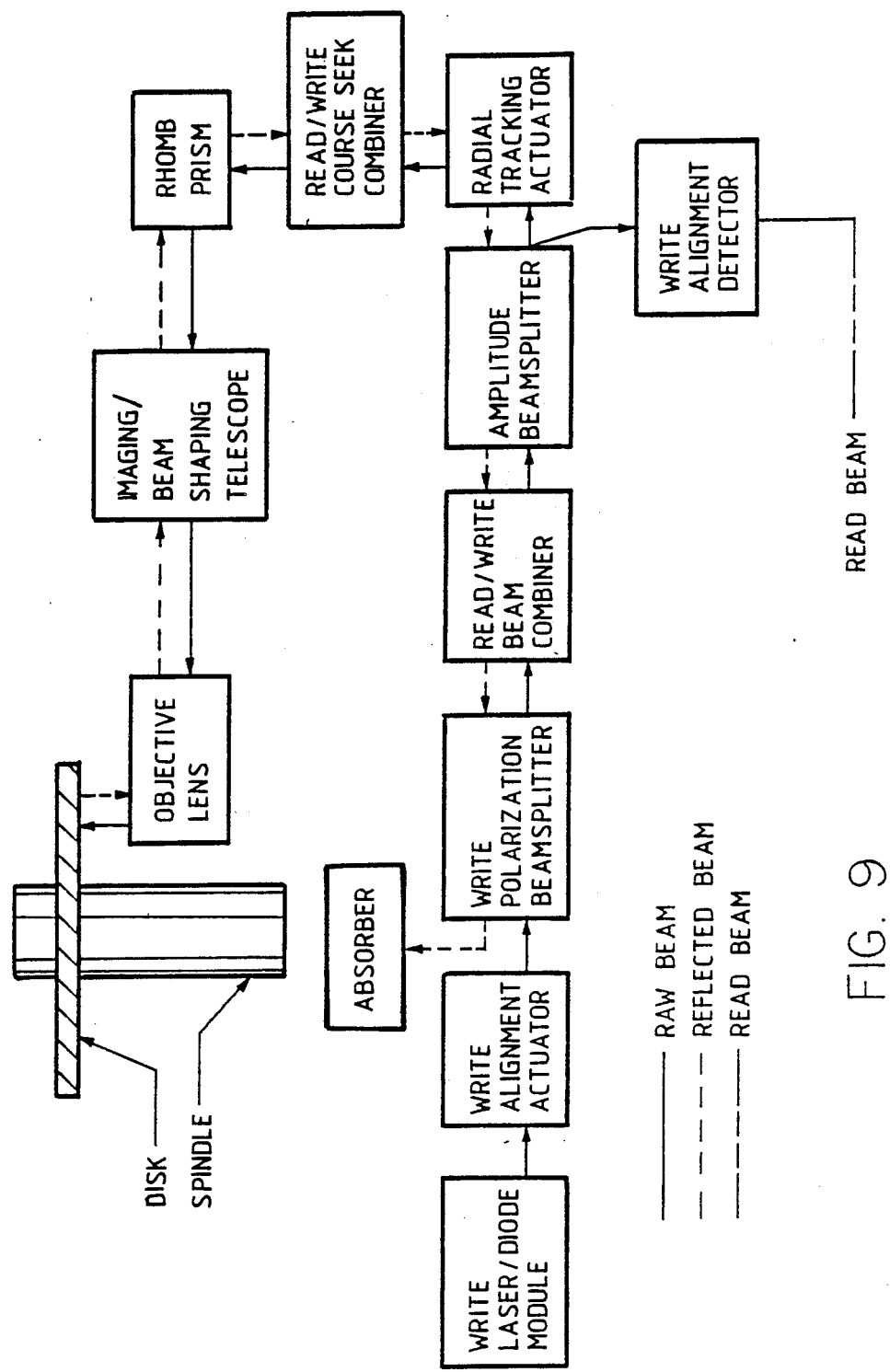
FIG. 9 is a block diagram of the Write Optics portion of FIG. 7.

Referring to FIGS. 7 and 9, the write beam originates with the Field Replacement Write Laser Diode Module. The infrared beam is emitted from the diode, is collected and collimated by the Collimator Lens (L34) and is transmitted through Shutter (SH1). The beam is circularized by the Prism Beam Expander subassembly (PR211, M30 and PR212) and is then expanded by the Collimating Telescope (L35 and L36). The expanded beam is reflected by the Write Alignment Actuator mirror (GA2 and M31) and is transmitted by the Write Polarization Beamsplitter (PB2) and the Read/Write Beam Combiner (WB1) so that the read and write beams are on a common path. The combined beams reach the Amplitude Beamsplitter which directs a small percentage of both beams to the Write Alignment Detector.

Write light transmitted by the Amplitude Beamsplitter is imaged onto the Radial Tracking Actuator mirror (GA1 and M24), is reflected by the Read/Write Coarse Seek Combiner (WB2) and Mirror M25, and enters the Rhomb Prism (RH21). The beam is transmitted through the Rhomb Prism and reflected by Mirror M26. It is expanded through the Imaging/Beam Shaping Telescope and Beam-Folding Mirror (L23, L24 and M27) and finally enters the entrance pupil of the Objective Lens (L25) through which it focuses to write upon the disk.

Write Path From Disk

The Write beam reflected by the disk is collected by the Objective lens (L25), is transmitted by the Imaging-/Beam Shaping Telescope and Beam-Folding Mirror (L23, L24 and M27), is reflected by Mirror M26, and transmitted by the Rhomb Prism. Once through the Rhomb Prism it is reflected by the Read/Write/Coarse Seek Combiner and strikes the surface of the Radial Tracking Actuator mirror (GA1 and M24). It is reflected by the actuator and transmitted through the Amplitude Beamsplitter (AB1) and the Read/Write Beam Combiner (WB1). Due to a 90° rotation of polarization the returning write beam is reflected by the Write Polarization Beamsplitter (PB2) and passes onto an Absorber which impedes any further travel of the beam.

Coarse Seek Path to Disk

Figure 10:
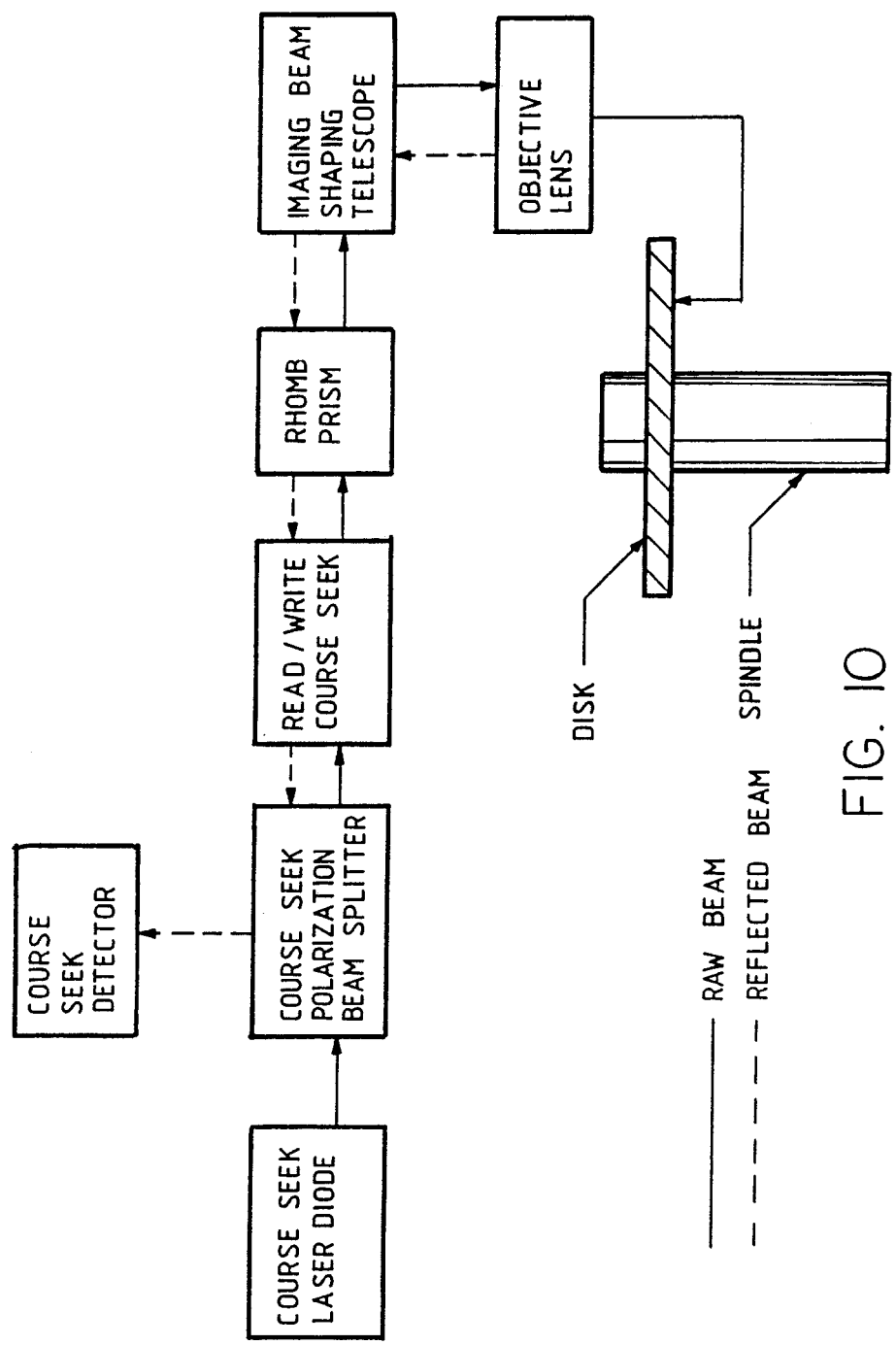
FIG. 10 is a block diagram of the Coarse Seek Optics portion of FIG. 7.

With reference to FIGS. 7 and 10, the Coarse Seek Path to the disk platter originates at the Coarse Seek Laser Diode (CSLD). The 780 nm infrared light is collected by a collimator lens (L31) and a cylindrical lens (L32). It is reflected by Mirror M28 and the Coarse Seek Polarization Beamsplitter (PB3). The beam is transmitted by the Retarder Plate (RP1), reflected by Mirror M29 and transmitted through the Read/Write/-Coarse Seek Combiner (WB2). The Coarse Seek beam then follows the same path as the HeNe and write laser light to the disk. The beam is transmitted through the Rhomb Prism and is reflected by Mirror M26. It is expanded in the Imaging/Beam Shaping Telescope and Beam-Folding Mirror (L23, L24 and M27) and passes through the Objective lens to reach the disk.

Coarse Seek Path From Disk

The return Coarse Seek beam comes out of the Objective Lens, passes through the imaging/Beam Shaping Telescope and Beam-Folding Mirror (L23, L24 and M27), and is reflected by Mirror M26. It is transmitted through the Rhomb Prism and the Read/Write/Coarse Seek Combiner (WB2) and reflected by Mirror M29.

Due to a 90° rotation of polarization caused by the return pass through the Rhomb Prism the reflected beam is now transmitted through the Coarse Seek Polarization Beamsplitter (PB3). The beam passes through Convex Lens L33 and Filter F23 until it is finally incident upon the Coarse Seek Detector (D23).

Referring next to only FIG. 2, it is seen that the coarse detector 31 comprises a detector 61 having a radiant energy collection surface 62 upon which radiation reflected from the disk surface area 11a is projected. This radiation has an energy centroid or "center-of-mass" 63 associated therewith, which energy centroid represents that point at which a single ray of radiation, having an intensity equivalent to all the radiation falling upon the surface 62, would fall on the surface 62. The detector 61, as explained more fully below, generates two separate output signals that are directed to signal processing circuitry 64 over signal lines 65 and 66. The output from the signal processing circuitry 64, the PES signal, is directed to the coarse access/tracking servo system 34 over signal line 67.

Figure 4:
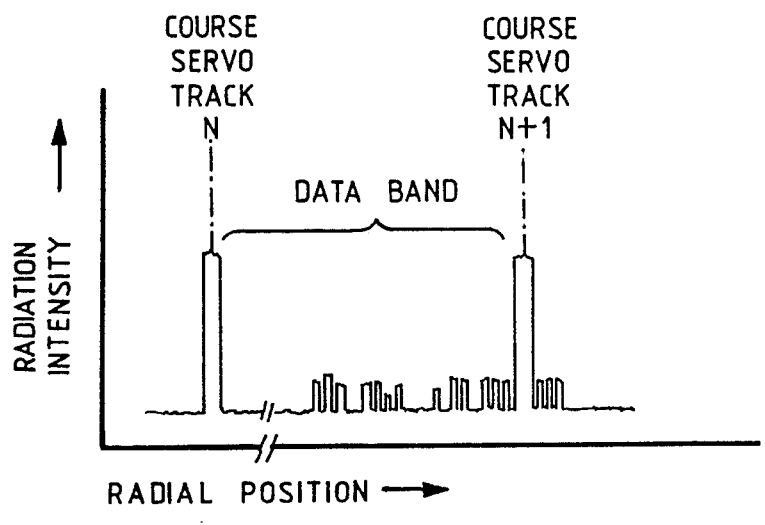
FIG. 4 conceptually illustrates how the intensity of the radiation reflected from the optical disk may vary as a function of disk radial position between two coarse servo tracks.

FIG. 4 conceptually depicts the levels of radiation that would be reflected from the surface of the disk along a radial axis thereof as a function of radial position. At a first coarse servo track N, a large amount of radiation is reflected (assuming that the writing of the coarse servo track creates a high-reflectivity condition). In the data band between this first coarse servo track N and an adjacent second coarse servo track N+1, varying amounts of radiation are reflected depending upon the presence or absence of data tracks and the type of data therein. This radiation is typically much lower in intensity than the radiation associated with the coarse servo tracks because the width of the data tracks is 3-5 times smaller than the width of the coarse servo tracks. Nonetheless, the radiation reflected from the data tracks within the data band can adversely impact the location of the energy centroid of all the radiation reflected from the illuminated strip area 11a (FIGS. 2 and 5). Hence, in order to assure consistency in locating the energy centroid regardless of whether data tracks are present or not within the data band, some means must be employed to identify only that radiation reflected from the coarse servo track. In accordance with the present invention, a known reflectivity pattern is placed in the coarse servo tracks for this purpose so that radiant energy reflected therefrom can be distinguished from radiant energy reflected from the data tracks which may or may not be present.

In a preferred embodiment, the reflectivity pattern selected for the coarse servo tracks is a repetitive on/off scheme such that the coarse servo track appears as a dashed line. This concept is best illustrated by the coarse servo tracks 17 and 18 in FIG. 5. A small segment of the coarse servo track 18a is written, causing a high reflectivity condition to exist. This high reflectivity segment 18a is followed by a segment 18b where no coarse servo track is written, causing a low reflectivity condition to exist. (In the preferred embodiment, the optical disk 11 exhibits low reflectivity if not written upon, and high reflectivity if written upon. This situation could, of course, be reversed without alternating the basic operating principles of the present invention.) As the disk 11 is rotated at a constant angular velocity, the coarse servo track illuminated in the illuminated strip or line area 11a will alternately reflect high and low amounts of radiation. Hence, the reflected radiation from the coarse servo track assumes a periodic pulsed pattern having a known frequency. By selecting a component of frequency of the reflected radiation from the coarse servo track to be different from the primary frequency components associated with the data that is recorded on the data tracks, this coarse track frequency can then be used as the mechanism for distinguishing the radiation reflected from the coarse servo track from that reflected from the data tracks using known filtering techniques.

Figure 11:
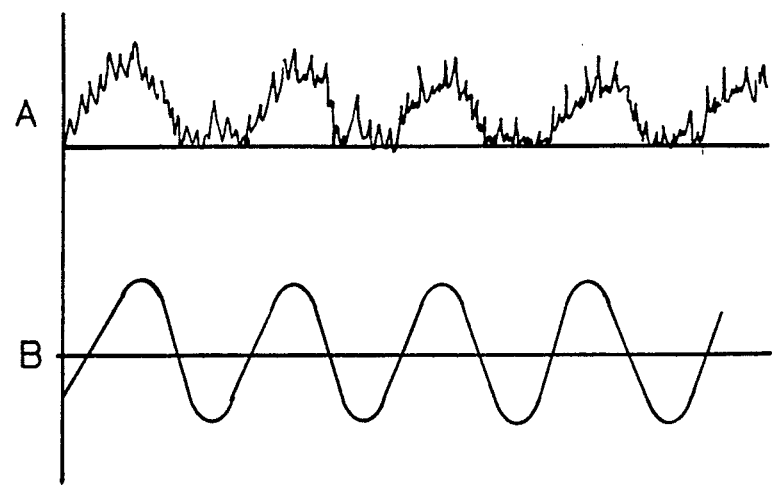
FIG. 11 is a timing diagram that illustrates the types of radiation signal reflected from the coarse illuminated area 11a of the optical disk surface (FIG. 5) when the disk is rotated at a constant angular velocity, before and after filtering.

The waveform A in FIG. 11 conceptually illustrates how the reflected radiation from the illuminated area 11a of the disk's surface appears as a function of time, i.e., as different portions of the disk 11 are rotated into and out of the illuminated area 11a at a constant velocity. The waveform B in FIG. 11 depicts how the waveform A could be "cleaned up" using filtering or equivalent techniques in order to pick out just those components of the waveform A that are attributable to the fixed-frequency radiation reflected from the coarse servo track.

Figure 12:
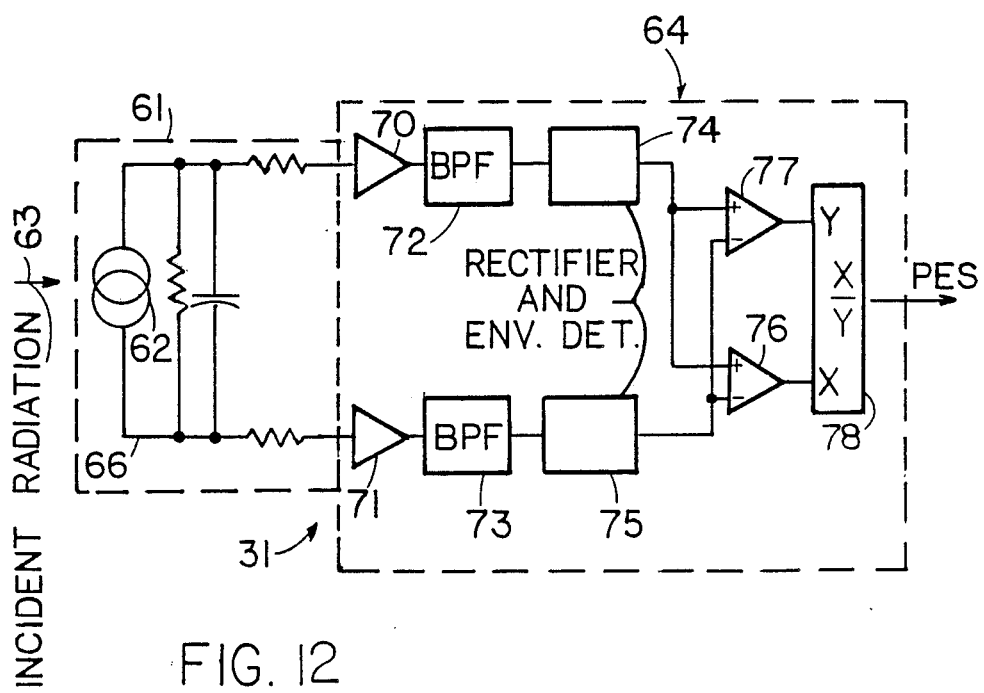
FIG. 12 is a block diagram of the coarse track detection system of the present invention.

Referring next to FIG. 12 there is shown a block diagram of the coarse detector 31 which may be utilized in accordance with the present invention. As explained previously, the detector 61 includes a collection surface 62 upon which reflected radiation from the coarse illuminated area 11a (FIGS. 2 and 11) is projected. This collection surface 62 is schematically depicted in FIG. 12 as a current generator because, as explained below, it generates two currents, each having an amplitude proportional to the intensity and location that the radiation falls on the collection surface respective to known reference points thereon. (The collection surface is typically a rectangle having known dimensions associated therewith. In the preferred embodiment, the reference location points are the respective ends of the collection surface.) As explained, radiation of varying levels actually falls upon much of the collection surface due to the radiation reflected from the data tracks. However, all of this radiation is equivalent to a single ray of radiation 63 falling upon the collection surface at the "energy centroid" location.

As explained, a first signal generated by the detector 61 is a current signal having an amplitude proportional to the intensity of the radiant energy falling upon the collection surface 62 and the distance between a first end of the collection surface 62 and the location where the centroid of radiant energy 63 strikes the collection surface 62. A second output signal from the detector 61 is likewise a current signal having an amplitude proportional to the intensity of the radiant energy incident to the collection surface 62 and the distance between a second end of the collection surface 62 and the point where the centroid of radiant energy 63 falls upon the surface 62.

The processing circuitry 64 includes transimpedance amplifiers 70, 71 that respectively convert the current signals from the detector 61 to voltage signals. The outputs of the transimpedance amplifiers 70, 71 are then directed to respective band pass filters 72, 73, which band pass filters are designed to have a center frequency equal to the fixed-frequency of the radiation reflected from the coarse servo tracks. Thus, while the input signals to the band pass filters 72, 73 may be a composite of all the radiation striking the collection surface 62, such as illustrated in waveform A of FIG. 11, the output signals from these band pass filters are limited to only that radiation reflected from the coarse servo tracks, such as illustrated in waveform B of FIG. 11. A rectifier and envelope detector circuit 74, 75 is then employed to generate a signal proportional to the amplitude of the signal outputted from the respective band pass filter circuits 72, 73. The output signal from the rectifier and envelope detector circuit 74 is then subtracted from the output signal from the rectifier and envelope detector circuit 75 in a difference amplifier 76. Similarly, the output signal from the rectifier and envelope detector circuit 74 is summed with the output signal from the rectifier and envelope detector circuit 75 in a summing circuit 77. The outputs of the difference amplifier 76 and summing amplifier 77 are then coupled to a divider circuit 78 in such a manner so as to cause the output of the difference amplifier 76 to be divided by the output of the summing amplifier 77. The output signal from the divider circuit 78 is the desired position error signal, or PES.

An analysis of the configuration shown in FIG. 12 reveals that the position error signal will have an amplitude proportional to the distance from one of the ends of the collection surface 62 that the centroid of the radiant energy associated with the coarse servo track falls upon said surface, but substantially independent of the intensity of the radiant energy falling upon said surface 62. (The divider circuit normalizes any energy variations.) Hence, the desired characteristics (proportional to distance but not to intensity) have been realized.

It should be noted that the processing circuit 64 of FIG. 2 could be realized using alternate configurations from that shown in FIG. 12. One such alternate configuration is discussed below in connection with FIG. 13. Another alternate configuration would involve a system that maintains the average intensity of the reflected laser energy as sensed at the detector 61 at a substantially constant level. Such a system would typically include feedback from the processing circuitry 64 to the coarse illuminator 30 (shown as a dotted line 31' in FIG. 2) in order to control the intensity of the incident laser beam. A suitable tolerancing system for controlling the laser beam intensity and disk reflectivity could also be used.

Figure 13:
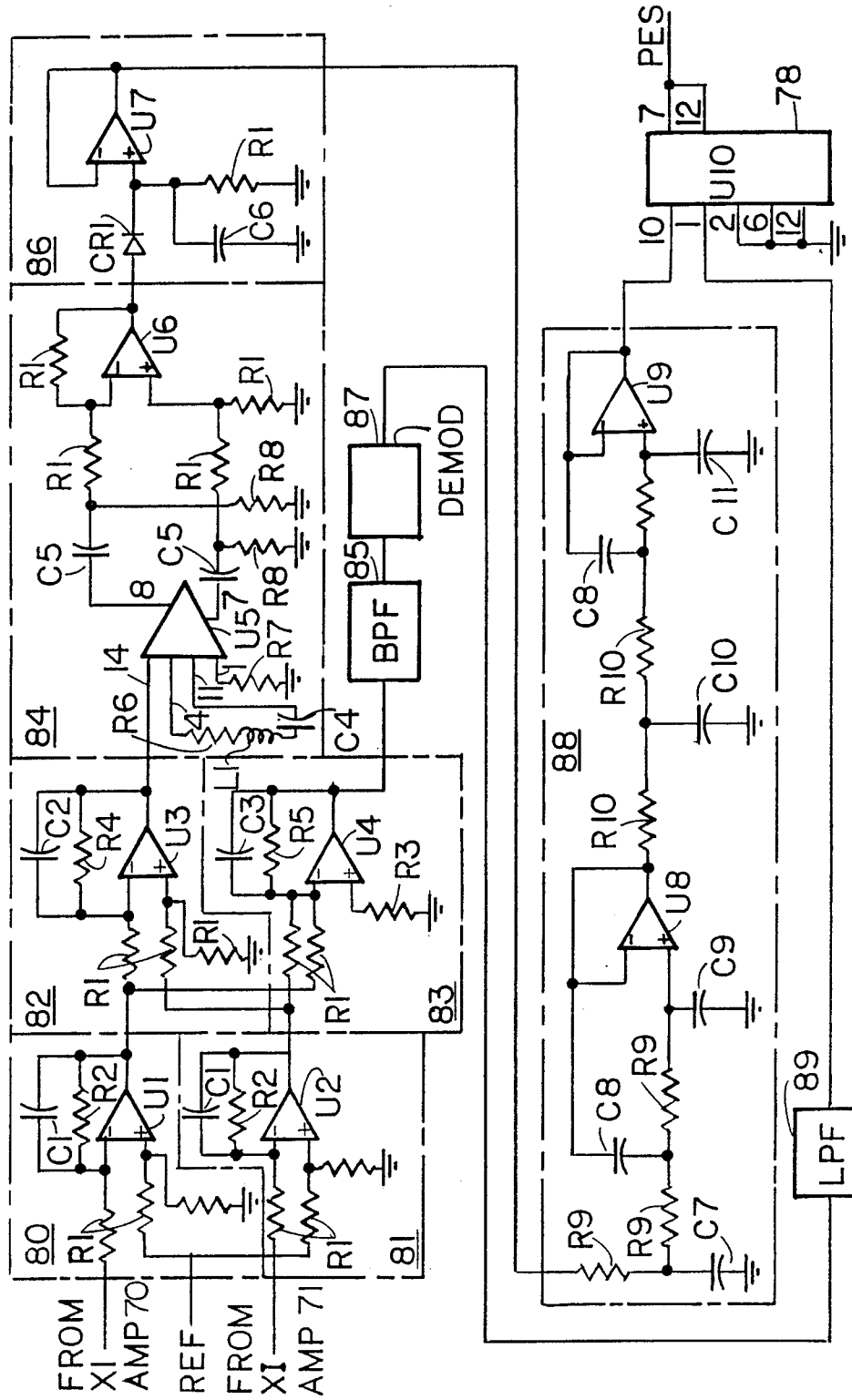
FIG. 13 is a block diagram of an alternative configuration of the coarse track detection system shown in FIG. 12.

Referring next to FIG. 13, there is shown a block diagram of an alternative configuration from that shown in FIG. 12. In FIG. 13, the order or sequence of processing the signals from the detector 61 has been altered from the processing sequence associated with FIG. 12. In FIG. 13, the use of the detector 61 and transimpedance amplifiers 70, 71 remains unchanged from FIG. 12. However, in FIG. 13 buffer amplifiers 80, 81 are interposed between the transimpedance amplifiers 70, 71 and a sum amplifier 83 and difference amplifier 82. Bandpass filters 84, 85, followed by demodulation circuits 86, 87, and lowpass filter circuits 88, 89, are then employed to process the outputs from the sum and difference amplifiers 82, 83, respectively, prior to presenting these processed signals to the divider circuit 78.

Figure 14:
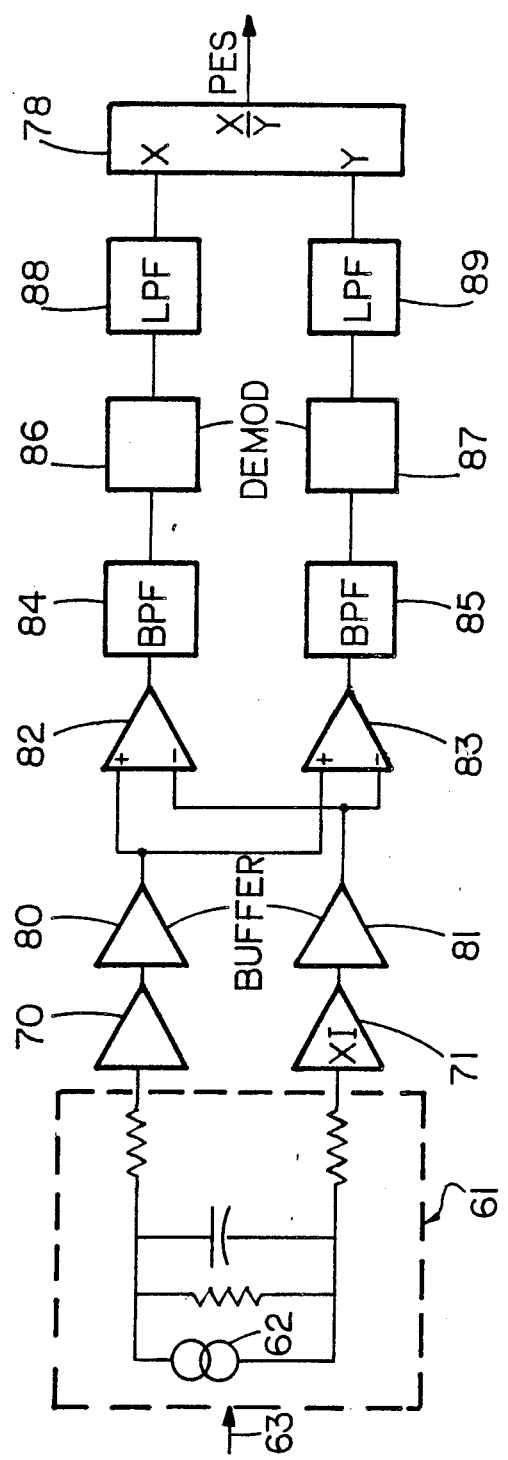
FIG. 14 is a schematic diagram of the configuration shown in FIG. 13.

FIG. 14 is a schematic diagram of the configuration shown in the block diagram of FIG. 12, not including the detector 61 and transimpedance amplifiers 70, 71. The details associated with the bandpass filter 85, demodulator 87, and lowpass filter 89 are not shown in FIG. 14 because they are either identical to or easily derived from the circuits of the bandpass filter 84, demodulator 86, and low pass filter 88, respectively. Representative circuit components for the schematic diagram of FIG. 14 are as indicated in Table 1. The components specified in Table 1 assume a detector 61 is used as described below.

TABLE 1

| Representative Component values for FIG. 9 | | |
|---|---|---|
| R1-10K | C1-8 pf | CR1-IN4448 |
| R2-30K | C2-3 pf | U1,U2,U3,U4-LF356A |
| R3-3.3K | C3-18 pf | U5-NE592 |
| R4-60K | C4-120 pf | U6-LF357A |
| R5-10K | C5-0.1 uf | U7,U8,U9-LF353A |
| R6-320 | C6-500 pf | U10-AD535 |

TABLE 1-continued

| Representative Component values for FIG. 9 | |
|---|---|
| R7-100 | C7-820 pf |
| R8-1K | C8-0.01 uf |
| R9-35K | C9-5 pf |
| R10-1.1K | C10-6800 pf |
| L1-6800 uh | C11-1800 pf |

The detector 61, including the collection surface 62, may be realized using a commercially available component manufactured by United Detector Technology, Inc., of Santa Monica, Calif. A United Technology "LSC" position sensing detector is particularly well suited for this use. Specifically, a United Detector Technology part number PIN-LSC/5D has been successfully used by applicants for this function. This device has an active area (collection surface 62) of 0.115 square centimeters. The length of the collection surface is roughly 0.21 inches (0.53 cm.).

Any suitable transimpedance amplifier, available from numerous IC manufacturers, could be employed for the amplifiers 70 and 71. In particular, an operational amplifier HA-5170 manufactured by Harris Semiconductor could be used for this purpose. (As those skilled in the art will recognize, any operational amplifier can be configured to function as a transimpedance amplifier.) Similarly, as described above in conjunction with FIG. 9, the difference and summing amplifiers 76 and 77 (or 82 and 83) may be realized using commercially available integrated circuit operational amplifiers, such as the LF353 manufactured by National Semiconductor. The divider circuit 78 may be realized with an AD535 Divider, manufactured by Analog Devices.

In the preferred embodiment of the present invention, the optical disk rotates at a speed of 1313 RPM, which speed is tightly controlled to within a tolerance of plus or minus 0.5 percent by a conventional speed-control servo system. With the disk rotating at this speed, the frequency associated with the reflectivity pattern of the coarse servo tracks is 175.6 KHz. In comparison, the encoded data that is written on the disk, while having frequency components lying in a band of from 0 Hz to 80 MHz, has very low energy components in the 170–180 KHz range, the frequency associated with the coarse servo tracks. Hence, reflected energy from the coarse servo tracks can be readily distinguished from reflected energy from data tracks.

As an additional advantage of embedding a fixed frequency signal within the coarse servo tracks, although not really a part of the present invention, it is noted that the fixed frequency signal derived from the coarse servo tracks can be used within the optical system for clocking or synchronization purposes, i.e., as an optical encoder.

As the reflected radiation from the illuminated strip or line area 11a falls upon the collection surface 62 of the detector 61, electrical signals are generated and processed in order to indicate the location on the collection surface 62 at which the coarse servo track image has fallen. While numerous detection and processing techniques could be used for this purpose, the preferred approach is as previously described herein with reference to FIGS. 11–14. Essentially, detection circuits are available that generate electrical signals that indicate the intensity and location of the radiation following thereupon. These electrical signals may then be processed, including using filtering techniques in order to filter out the effects of unwanted radiation (such as has been reflected from data tracks) so that the "energy centroid" as ultimately detected is not biased adversely with energy that has been reflected from data tracks. As has been explained previously the end result is that a position error signal (PES) is generated that indicates the location at which the coarse servo track image falls upon the collection surface 62 of the coarse detector 31. This signal serves as a feedback signal for the coarse servo system as previously described so that the carriage optics 23 may be radially positioned at a desired location with respect to a given coarse servo track.

Referring next to FIG. 6a there is shown a representation of how the illuminated strip or line area 11a may be positioned relative to a coarse servo track 17 on the surface of the disk 11. In the particular embodiment shown in FIG. 6a, the illuminated strip area 11a is centered over the coarse servo track 17. Thus, after suitable filtering and processing techniques have been used as described herein to filter out unwanted reflected radiation from the data tracks lying on either side of the coarse servo track 17, the "energy centroid" will be attributable only to radiation reflected from the high reflectivity portions of the coarse servo track 17.

In an alternative embodiment, shown in FIG. 6b, the illuminated strip or line area 11a may be positioned over two servo tracks 17 and 18. In this embodiment, after suitable filtering and processing techniques have been used as described herein before to filter out the effects of unwanted radiation associated with data tracks lying between or on either side of the coarse servo tracks 17 or 18, the "energy centroid" of all of the radiation falling upon the detector 61 will be a composite of the radiation reflected from both the servo track 17 and the servo track 18. The composite energy centroid thus derived allows the coarse servo system to position the carriage optics 23 at a desired radial location with respect to the disk the same as is achieved using the approach shown in FIG. 6a.

The method of writing coarse servo tracks on a disk in accordance with the present invention comprises using precision servo writing equipment. Such equipment, which is suitable for use only in a tightly controlled environment, and which is very expensive and cumbersome to operate (and therefore not suitable for commercial optical disk storage applications) is used by the disk manufacturer as the optical disks are fabricated. A blank disk is inserted in such a servo writer and aligned on a spindle thereof. The disk is then rotated at a constant angular velocity which is very tightly controlled. A write laser beam having a desired diameter—that is, a laser beam having sufficient energy to permanently mark the surface of the optical disk—is then directed to a precise radial location on the disk. If this write laser beam were allowed to remain continuously on, a circular track would thus be marked on the disk surface as the disk rotates. However, in accordance with the method of the present invention, the write servo beam is modulated with a modulation signal having a desired frequency such that the write laser beam switches off and on between low and high power levels. The high power level is sufficient to mark the disk surface, whereas the low power level is not. Thus, a servo track is marked on the surface of the disk as comprising alternating high reflectivity and low reflectivity regions, much as a "dashed line". After one servo track is permanently marked on the surface of the disk in this fashion, the write laser beam is directed to another precise radial position on the disk to place the next servo track thereon. In the preferred embodiment, these servo tracks are uniformly spaced on the surface of the disk so that a fixed number of data tracks may be subsequently written in the data band region lying between the servo tracks.

The actual marking mechanism associated with the optical disk media that is used within an optical disk storage system in accordance with the present invention is not important. Numerous marking mechanisms are known in the art and are described in the literature. Moreover, other suitable marking mechanisms are being developed. Typically, optical media comprises a tellurium based alloy that is sensitive to the energy associated with a focused laser beam. One type of optical disk media that could be employed is disclosed in copending patent application Ser. No. 533,526, filed 09/19/83, which application is assigned to this same assignee as is this application. Another type of optical recording structure is disclosed in application Ser. No. 499,666, filed 05/31/83, which application is also assigned to the same assignee as is this application. It is contemplated that other optical recording structures suitable for use with the present invention will yet be developed.

While the invention herein disclosed has been described by means of specific embodiments and applications thereof, numerous modifications and variations could be made thereto by those skilled in the art without departing from the spirit and scope of the present invention. It is therefore to be understood that within the scope of the appended claims, the invention may be practiced otherwise then as specifically described herein.

What is claimed is:

1. An information recording disk for use with an optical storage system having means, including a light source that produces at least one light beam for reading information recorded on said disk and for positioning said light source to read said information, and means for producing a focussed beam of radiation with a power level above a prescribed threshold for selectively writing data on said disk, said disk comprising:
   a disk substrate;
   a radiation sensitive layer covering said substrate, said layer being markable when exposed to said focused beam of radiation so as to reflect said light beam at least at a predetermined energy level in a range of frequencies; and
   a plurality of concentric, uniformly-spaced coarse servo positioning tracks marked on said layer to form an annular region between each adjacent pair of said coarse servo positioning tracks each of said coarse servo positioning tracks having marked therein a known reflectivity pattern, said annular regions between said coarse servo positioning tracks being available for the selective writing of concentric data tracks by exposure to said focussed beam, wherein said known reflectivity pattern reflects said light beam at a level that is substantially greater than said predetermined energy level, thereby distinguishing said coarse servo positioning tracks from said data tracks.

2. The recording disk of claim 1 wherein each of said coarse servo tracks comprises a ring or circle of a prescribed radius marked on the sensitive layer of the disk, and said ring or circle being substantially concentric with the disk, and said ring or circle being defined by a track that includes a sequence of alternating marked and non-marked segments of width at least three times the width of said data tracks.

3. An optical disk, comprising
   a disk-shaped substrate;
   a radiation-markable layer covering a surface of said substrate, said layer adapted to be marked for reflecting light energy from said surface;
   a plurality of annular regions on said layer, each said annular region including a plurality of concentric data tracks each of which are adapted to be marked for storage of data having a bandwidth of reflectable energy at a predetermined level of intensity; and
   a plurality of concentric, uniformly-spaced coarse servo positioning tracks marked on said layer, each said coarse servo positioning track separating adjacent ones of said annular regions and having a known reflectivity pattern marked thereon for distinguishing said coarse servo positioning tracks from said data tracks when a radially-extending portion of said tracks and said data tracks is simultaneously illuminated, said known reflectivity pattern adapted to reflect energy at a level of intensity that is significantly greater than said predetermined level of intensity.

4. The optical disk according to claim 3, wherein reflectable energy from said portion comprises reflectable energy from said data bands in said bandwidth at said predetermined level of intensity and reflectable energy from said at least one of said coarse servo positioning tracks, and wherein the reflectable energy from said at least one of said coarse servo positioning tracks has a reflectivity pattern that reflects said light energy at a predetermined frequency.

5. The optical disk of claim 4 wherein said predetermined frequency is within said bandwidth.

6. The optical disk of claim 3 wherein said known reflectivity pattern is at least three times the width of said data tracks.

* * * * *